United States Patent
Sakai et al.

(10) Patent No.: US 12,043,763 B2
(45) Date of Patent: Jul. 23, 2024

(54) EFFECT PAINT FOR AUTOMOBILE

(71) Applicant: KANSAI PAINT CO., LTD., Hyogo (JP)

(72) Inventors: Kenji Sakai, Kanagawa (JP); Nobuhiko Narita, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 227 days.

(21) Appl. No.: 17/623,977

(22) PCT Filed: Jun. 17, 2020

(86) PCT No.: PCT/JP2020/023683
§ 371 (c)(1),
(2) Date: Dec. 30, 2021

(87) PCT Pub. No.: WO2021/002196
PCT Pub. Date: Jan. 7, 2021

(65) Prior Publication Data
US 2022/0348773 A1    Nov. 3, 2022

(30) Foreign Application Priority Data

Jul. 3, 2019 (JP) .................................. 2019-124125
Jan. 27, 2020 (JP) .................................. 2020-010590

(51) Int. Cl.
| | | |
|---|---|---|
| C09D 5/36 | (2006.01) |
| C09D 7/45 | (2018.01) |
| C09D 7/65 | (2018.01) |
| C09D 101/04 | (2006.01) |
| C09D 101/08 | (2006.01) |

(52) U.S. Cl.
CPC ................ C09D 5/36 (2013.01); C09D 7/45 (2018.01); C09D 7/65 (2018.01); C09D 101/04 (2013.01); C09D 101/08 (2013.01)

(58) Field of Classification Search
CPC ... C09D 5/36; C09D 7/45; C09D 7/65; C09D 101/04; C09D 101/08; C09D 151/003; C09D 7/43; C09D 7/70; C09D 167/04; C09D 201/02; C09D 201/08; C09D 101/02; C09D 7/62; C09D 7/63; C08F 265/06; C08F 220/14; C08F 220/16; C08F 220/1802; C08G 63/137; C08G 63/60; C08G 18/0814; C08G 18/48; C08G 18/8061; C08K 2003/0807; C08K 2003/0812; C08B 15/04; C08L 2205/16; C08L 33/066; C08L 1/04; D21C 9/007; B05D 5/067; B05D 7/14
USPC ....................................................... 523/171
See application file for complete search history.

(56) References Cited

U.S. PATENT DOCUMENTS

| | | | |
|---|---|---|---|
| 2013/0225739 A1* | 8/2013 | Spinelli ................ | C09D 11/322 524/505 |
| 2014/0053828 A1* | 2/2014 | Tsuji ....................... | D01F 1/02 127/37 |
| 2019/0308217 A1 | 10/2019 | Okazaki et al. | |
| 2020/0238333 A1 | 7/2020 | Itoh et al. | |
| 2021/0348004 A1* | 11/2021 | Sakai ................... | C09D 17/001 |

FOREIGN PATENT DOCUMENTS

| | | |
|---|---|---|
| JP | 63-272544 | 11/1988 |
| JP | 2006-095522 | 4/2006 |
| JP | 2009-155537 | 7/2009 |
| WO | 2016/129422 | 8/2016 |
| WO | 2017/175468 | 10/2017 |
| WO | 2018/012014 | 1/2018 |

OTHER PUBLICATIONS

International Search Report issued Aug. 11, 2020 in International (PCT) Application No. PCT/JP2020/023683.

* cited by examiner

*Primary Examiner* — Hannah J Pak
(74) *Attorney, Agent, or Firm* — Wenderoth, Lind & Ponack, L.L.P.

(57) ABSTRACT

An effect paint for automobiles, comprising water, a dispersant (A), cellulose nanofibers (B), and an effect pigment (C).

2 Claims, No Drawings

EFFECT PAINT FOR AUTOMOBILE

TECHNICAL FIELD

The present invention relates to an effect paint for automobiles.

BACKGROUND ART

The main purpose of applying paint is to protect materials, and to impart an excellent appearance to materials. In industrial commodities, great value is placed on excellent appearance, in particular "texture," to enhance product appeal. Although the texture of the industrial commodities desired by consumers varies, metallic or pearlescent luster (metallic luster and pearlescent luster are collectively referred to as "metallic or pearly luster" below) has been in demand in fields such as automobile exterior panels and automobile parts.

Metallic or pearly luster refers to a texture that has no surficial graininess, like the surface of a mirror; that shines brilliantly when a coated plate is viewed from the vicinity of the specular reflection light (highlight); and that looks dark when a coated plate is viewed from a point where the reflected light intensity is relatively low, away from the specular reflection light (bottom). In other words, there is a large difference in luminance between the highlight region and the bottom region of the texture.

Techniques to impart such metallic or pearly luster to the surface of industrial commodities include metal plating and metal deposition (e.g., PTL 1). However, paint that can impart metallic or pearly luster is advantageous, for example, in terms of simplicity and cost. If the paint is an aqueous paint, it is more advantageous from the viewpoint of burden on the environment.

PTL 2 discloses an aqueous base paint composition containing an effect pigment composed of metal flakes obtained by crushing a vapor deposition metal film and an aqueous cellulose derivative having an acid value of 20 to 150 mg KOH/g (solids content), wherein the aqueous cellulose derivative serves as a main binder resin, and the content of the effect pigment is 20 to 70 mass % as PWC.

However, the coating film formed of the paint composition disclosed in PTL 2 is unsatisfactory in terms of metallic or pearly luster.

PTL 3 discloses a coating method of an aqueous base-coat paint that contains a flake-effect pigment; the coating method includes applying an aqueous base-coat paint (A1) adjusted to have a solids content of 20 to 40 wt % in the paint to a substrate, so as to have a thickness of 1 to 15 µm on a dry film basis; and applying an aqueous base-coat paint (A2) adjusted to have a solids content of 2 to 15 wt % in the paint to the uncured coating film, so as to have a thickness of 0.1 to 5 µm on a dry film basis.

However, the coating film formed by the coating method of PTL 3 is unsatisfactory in terms of metallic or pearly luster.

CITATION LIST

Patent Literature

PTL 1: JPS63-272544A
PTL 2: JP2009-155537A
PTL 3: JP2006-095522A

SUMMARY OF INVENTION

Technical Problem

An object of the present invention is to provide an effect paint for automobiles capable of forming a coating film with excellent metallic or pearly luster.

Solution to Problem

The present inventors conducted extensive research to achieve the above object, and found that the above problems can be solved by using a paint for automobiles that comprises water, a dispersant (A), cellulose nanofibers (B), and an effect pigment (C). The present invention has been accomplished based on this finding.

A first embodiment of the present invention provides an effect paint for automobiles, comprising water, a dispersant (A), cellulose nanofibers (B), and an effect pigment (C).

In one embodiment, the dispersant (A) is an anionic polymer compound.

In another embodiment, the anionic polymer compound is a carboxy-containing polymer compound or a phosphate group-containing polymer compound.

In another embodiment, the cellulose nanofibers (B) are anionically modified cellulose nanofibers.

In another embodiment, the anionically modified cellulose nanofibers are oxidized cellulose nanofibers.

In another embodiment, the oxidized cellulose nanofibers have a carboxyl group amount of 0.4 to 1.0 mmol/g.

In another embodiment, the effect paint for automobiles has a solids content of 0.1 to 10 parts by mass, per 100 parts by mass of all of the components.

Advantageous Effects of Invention

According to the present invention, an effect paint for automobiles capable of forming a coating film with excellent metallic or pearly luster can be obtained.

DESCRIPTION OF EMBODIMENTS

Effect Paint for Automobiles

The effect paint for automobiles according to an embodiment of the present invention comprises water, a dispersant (A), cellulose nanofibers (B), and an effect pigment (C).

Dispersant (A)

The dispersant (A) is not particularly limited as long as the effects of the present invention are ensured. For example, a low-molecular-weight compound or polymer compound, such as carboxylic acid, urethane, polyether, polyester, or fatty acid, can be used. Considering the properties of the cellulose nanofibers (B) and the effect pigment (C) contained in the effect paint for automobiles of the present invention, it is preferable to select a compound that allows for good dispersibility. Since the cellulose nanofibers (B) contain a large amount of hydroxyl groups, if the dispersant contains a large amount of hydrophobic groups, the dispersibility may be impaired. Further, any type of anionic, cationic, or nonionic dispersants can be used. The dispersants (A) may be used singly or in a combination of two or more as a mixture. The dispersant (A) used in the present invention does not include the cellulose nanofibers (B) described later.

When an anionic polymer compound is used as the dispersant (A), a polymer compound having one or more functional groups, such as carboxyl groups, sulfonic acid groups, phosphate groups, or sulfuric acid ester groups, can be used, and the functional groups become anionic by using such compounds at a pH higher than the acid dissociation constant (pKa) of the individual functional groups. Thus, the effect paint for automobiles can be prepared without aggregation of a dispersion of anionically modified cellulose nanofibers. The functional groups may be appropriately selected according to the pH of the effect paint for automobiles to be prepared, and the required basicity.

Examples of carboxy-containing polymer compounds include polycarboxylic acids, carboxymethyl cellulose, alginic acid, and the like. Examples of polycarboxylic acids include polyacrylic acid, sodium polyacrylate, styrene-maleic anhydride copolymers, olefin-maleic anhydride copolymers, and the like. When a carboxy-containing polymer compound is used as the dispersant (A), the carboxyl groups may be in metal salt form or in ammonium salt form. Of these, the carboxyl groups are preferably in metal salt form, and more preferably in sodium salt form, from the standpoint of the metallic or pearly luster of the obtained coating film. When the effect paint for automobiles of the present invention is used for applications that require water resistance, the ammonium salt form can be appropriately selected.

Examples of phosphate group-containing polymer compounds include polyoxyethylene alkyl ether phosphoric acid salts, polyoxyethylene phenyl ether phosphate, alkyl phosphoric esters, and the like.

Examples of urethane-based compounds include urethane association-type compounds and the like. The compatibility and steric hindrance stability can be adjusted by, for example, using polyurethane as the main skeleton and polyester chain(s) or polyether chain(s) as side chain(s).

Examples of polyether-based compounds include Pluronic polyethers, polyether dialkyl esters, polyether dialkyl ethers, polyether epoxy-modified compounds, polyether amines, and the like. The balance between hydrophilic and hydrophobic properties can be adjusted by, for example, changing the proportion of polyoxyethylene or polyoxypropylene.

Examples of polyester-based compounds include aliphatic polyesters, which are dehydration condensates of hydroxycarboxylic acids, and modified compounds thereof.

Examples of fatty acid-based compounds include aliphatic alcohol sulfuric acid salts, aliphatic amines, aliphatic esters, and the like.

The amount of the dispersant (A) added to the effect paint for automobiles of the present invention is an amount that is sufficient to disperse the effect pigment (C). The amount of the dispersant (A) is preferably 0.01 to 25 parts by mass, and more preferably 0.1 to 10 parts by mass, per 100 parts by mass of the effect pigment (C).

Cellulose Nanofibers (B)

In the present invention, the cellulose nanofibers (CNF) (B) are fine fibers having a fiber diameter of about 3 to 500 nm obtained by pulverizing a cellulose starting material, such as pulp, to a nanometer level. The cellulose nanofibers may also be referred to as cellulose nanofibrils, fibrillated cellulose, or nanocellulose crystals. The average fiber diameter and average fiber length of the cellulose nanofibers can be determined by averaging the fiber diameters and fiber lengths obtained from the results of observation of individual fibers using an atomic force microscope (AFM) or transmission electron microscope (TEM).

The cellulose nanofibers (B) can be obtained by applying mechanical force to a cellulose starting material, such as pulp, to pulverize it or obtained by defibrating modified cellulose obtained by chemical modification, such as anionically modified cellulose (e.g., carboxylated cellulose (also referred to as oxidized cellulose), carboxymethylated cellulose, or cellulose in which a phosphoric acid ester group is introduced) or cationically modified cellulose. The average fiber length and average fiber diameter of the fine fibers can be adjusted by oxidation treatment or defibration treatment.

The lower limit of the average aspect ratio of the cellulose nanofibers (B) used in the present invention is not particularly limited. The average aspect ratio of the cellulose nanofibers (B) is generally 50 or more. The upper limit is not particularly limited, and is generally 1000 or less, preferably 700 or less, and more preferably 500 or less. The average aspect ratio can be calculated by the following formula:

Aspect ratio=average fiber length/average fiber diameter

Cellulose Starting Material

The origin of the cellulose starting material of the cellulose nanofibers (B) is not particularly limited, and includes, for example, plants (e.g., wood, bamboo, hemp, jute, kenaf, farmland waste, cloth, and pulp (softwood unbleached kraft pulp (NUKP), softwood bleached kraft pulp (NBKP), hardwood unbleached kraft pulp (LUKP), hardwood bleached kraft pulp (LBKP), bleached kraft pulp (BKP), softwood unbleached sulfite pulp (NUSP), softwood bleached sulfite pulp (NESP), thermomechanical pulp (TMP), and recycled pulp), and waste paper), animals (e.g., Ascidiacea), algae, microorganisms (e.g., acetic acid bacteria (*Acetobacter*)), microorganism-producing products, and the like. As the cellulose starting material, any of them may be used, or two or more of them may be used in combination. Plant- or microorganism-derived cellulose starting materials (e.g., cellulose fibers) are preferable, and plant-derived cellulose starting materials (e.g., cellulose fibers) are more preferable.

The number average fiber diameter of the cellulose starting material is not particularly limited, and is about 30 to 60 μm in the case of softwood kraft pulp, which is common pulp; and about 10 to 30 μm in the case of hardwood kraft pulp. In the case of other pulp subjected to general purification, the number average fiber diameter is about 50 μm. When the cellulose starting material having a size of several centimeters, such as chips, is purified, it is preferable to adjust the number average fiber diameter to about 50 μm by performing mechanical treatment of the starting material with a disintegrator, such as a refiner and a beater.

Chemical Modification

In the present invention, the modified cellulose may be anionically modified cellulose or cationically modified cellulose. It is preferable to use modified cellulose that allows for good dispersion of the effect pigment (C), in consideration of the types of the dispersant (A) and effect pigment (C) contained in the effect paint for automobiles of the present invention. For example, when an anionic polymer compound is used as the dispersant (A), it is preferable to select anionically modified cellulose nanofibers from the standpoint of ease of obtaining a synergistic effect to suppress the aggregation of the effect pigment (C).

Examples of functional groups that can be introduced by anionic modification include carboxyl groups, carboxymethyl groups, sulfone groups, phosphoric acid ester groups, and nitro groups. Of these, carboxyl groups, carboxymethyl groups, and phosphoric acid ester groups are preferable, and carboxyl groups are more preferable.

Carboxylation

In the present invention, when carboxylated (oxidized) cellulose is used as modified cellulose, the carboxylated cellulose (also referred to as oxidized cellulose) can be obtained by carboxylating (oxidizing) the cellulose starting material described above by a known method. In carboxylation, the amount of carboxyl groups is preferably adjusted to 0.2 to 1.55 mmol/g, and more preferably 0.4 to 1.0 mmol/g, based on the absolute dry mass of the carboxylated cellulose nanofibers (oxidized cellulose nanofibers), from the standpoint of the viscosity stability of the effect paint for automobiles of the present invention, and the water resistance and metallic or pearly luster of the obtained coating film. In particular, the amount of carboxyl groups is preferably 0.5 to 1.0 mmol/g, and more preferably 0.6 to 1.0 mmol/g, based on the absolute dry mass of the carboxylated cellulose nanofibers (oxidized cellulose nanofibers). If the amount of carboxyl groups is overly small, a large amount of energy is required for defibration in order to obtain a highly transparent and uniform cellulose nanofiber dispersion. A highly transparent cellulose nanofiber dispersion, in which the amount of the remaining coarse material, such as non-defibrated fibers, is small, is useful for obtaining a coating film with excellent metallic or pearly luster. If the amount of carboxyl groups is overly large, a decrease in the viscosity of the cellulose nanofiber dispersion caused by deterioration of the fibers due to a reaction with an excessive amount of an oxidizing chemical, or a decrease in the viscosity retention due to stirring treatment is a concern. The relationship between the amount of carboxyl groups and the viscosity retention is not always clear. However, it is presumed that when modified pulp with a low degree of modification is sufficiently defibrated, portions having hydroxyl groups that have not been chemically surface-treated are exposed, the surface charge of the oxidized CNF is reduced, and the oxidized CNF is more likely to mutually form hydrogen bonds, thereby retaining the viscosity at low shear. In the present specification, when indicating the degree of modification, the amount of carboxyl groups refers to the total amount of carboxyl groups (—COOH) and carboxylate groups (—COO$^-$).

An example of the method for measuring the amount of carboxyl groups is described below. 60 mL of a 0.5 mass % slurry (aqueous dispersion) of oxidized cellulose is prepared, a 0.1 M aqueous hydrochloric acid solution is added to adjust the pH to 2.5, and then the electrical conductivity is measured until the pH reaches 11 by adding dropwise a 0.05 N aqueous sodium hydroxide solution. The amount of carboxyl groups can be calculated using the following formula, based on the amount of sodium hydroxide ("a (mL)") consumed in the neutralization stage of weak acid, which shows a gradual change in the electrical conductivity.

Amount of carboxyl groups (mmol/g oxidized cellulose)=a (mL)×0.05/mass (g) of oxidized cellulose In the effect paint for automobiles of the present invention, it is preferable to use cellulose nanofibers having a transparency of preferably 80% or more, more preferably 85% or more, and even more preferably 90% or more in a 1.0 mass % aqueous dispersion as the cellulose nanofibers (B), from the standpoint of the metallic or pearly luster of the formed coating film.

The transparency as used in the present specification refers to the transmittance of light at a wavelength of 660 nm when the cellulose nanofibers (B) are formed into an aqueous dispersion with a solids content of 1.0% (w/v). The transparency of the cellulose nanofibers (B) can be determined as follows: A dispersion of the cellulose nanofibers (B) (solids content: 1.0% (w/v), dispersion medium: water) is prepared, and the transmittance of light at a wavelength of 660 nm is measured with a UV-1800 UV-VIS spectrophotometer (produced by Shimadzu Corporation) using a square cell with an optical path length of 10 mm.

It is preferable that the cellulose nanofibers (B) used in the present invention are less likely to undergo changes in viscosity, even when the cellulose nanofibers (B) are subjected to shear for a long period of time. Specifically, the percentage of change of the viscosity at a shear rate of 0.1 ($s^{-1}$) measured after the effect paint for automobiles of the present invention is stirred with a stirrer at a rotational speed of 1000 rpm for 24 hours and then allowed to stand for 6 hours, with respect to the viscosity at a shear rate of 0.1 ($s^{-1}$) measured after the effect paint for automobiles of the present invention is allowed to stand for 6 hours, is less than 60%, preferably less than 40%, and more preferably less than 30.

Examples of the carboxylation (oxidation) method include a method of oxidizing the cellulose starting material in water using an oxidizing agent in the presence of an N-oxyl compound and a compound selected from the group consisting of a bromide, an iodide, and a mixture thereof. This oxidation reaction selectively oxidizes the primary hydroxyl group at the C6 position of the glucopyranose ring on the surface of cellulose. As a result, cellulose fibers having, on their surface, an aldehyde group and a carboxyl group (—COOH) or a carboxylate group (—COO$^-$) can be obtained. The concentration of cellulose during the reaction is not particularly limited, and is preferably 5 mass % or less.

The N-oxyl compound refers to a compound that can generate nitroxy radicals. As the N-oxyl compound, any compound can be used as long as it is a compound that promotes the desired oxidation reaction. Examples of the N-oxyl compound include 2,2,6,6-tetramethylpiperidine-1-oxy radical (TEMPO) and derivatives thereof (e.g., 4-hydroxy TEMPO).

The amount of the N-oxyl compound used is not particularly limited as long as it is a catalyst amount capable of oxidizing cellulose as a starting material. The amount of the N-oxyl compound is, for example, preferably 0.01 to 10 mmol, more preferably 0.01 to 1 mmol, and even more preferably 0.05 to 0.5 mmol, per gram of absolutely dry cellulose. The amount of the N-oxyl compound used is also preferably about 0.1 to 4 mmol/L relative to the reaction system.

The bromide is a compound containing bromine, and examples thereof include alkali metal bromides that can be dissociated and ionized in water. The iodide is a compound containing iodine, and examples thereof include alkali metal iodides. The amount of the bromide or iodide used can be selected within the range in which the oxidation reaction can be promoted. The total amount of the bromide and iodide is, for example, preferably 0.1 to 100 mmol, more preferably 0.1 to 10 mmol, and even more preferably 0.5 to 5 mmol, per gram of absolutely dry cellulose.

As the oxidizing agent, known oxidizing agents can be used. Examples of usable oxidizing agents include halogen; hypohalous acid, halous acid, perhalogenic acid or salts thereof; halogen oxide, peroxide, and the like. Preferable among these is sodium hypochlorite, which is inexpensive and has a low environmental burden. The amount of the oxidizing agent used is, for example, preferably 0.5 to 500 mmol, more preferably 0.5 to 50 mmol, even more preferably 1 to 25 mmol, and most preferably 3 to 10 mmol, per gram of absolutely dry cellulose. Further, the amount of the oxidizing agent used is, for example, preferably 1 to 40 mol, per mol of the N-oxyl compound.

In the cellulose oxidation, the reaction can proceed efficiently even under relatively mild conditions. Therefore, the reaction temperature is preferably 4 to 40° C., and may be room temperature of about 15 to 30° C. As the reaction progresses, carboxyl groups are formed in cellulose; thus, the pH of the reaction liquid decreases. In order to allow the oxidation reaction to proceed efficiently, an alkaline solution, such as an aqueous sodium hydroxide solution, is added to maintain the pH of the reaction liquid at preferably about 8 to 12, and more preferably about 10 to 11. Water is preferable as the reaction medium because it is easy to handle and side reactions are less likely to occur.

The reaction time in the oxidation reaction can be suitably set according to the degree of progress of oxidation, and is generally about 0.5 to 6 hours, for example, about 0.5 to 4 hours.

The oxidation reaction may be carried out in two steps. For example, oxidized cellulose obtained by filtration after the completion of the first-step reaction is oxidized again under the same or different reaction conditions, whereby the reaction is not inhibited by salts produced as by-products in the first-step reaction, and the cellulose can be oxidized efficiently.

Another example of the carboxylation (oxidation) method is a method of oxidation by bringing an ozone-containing gas into contact with the cellulose starting material. As a result of this oxidation reaction, the hydroxyl groups at least at positions of 2 and 6 of the glucopyranose ring are oxidized, and cellulose chains are decomposed. The ozone concentration in the ozone-containing gas is preferably 50 to 250 g/m$^3$, and more preferably 50 to 220 g/m$^3$. The amount of ozone added to the cellulose starting material is preferably 0.1 to 30 parts by mass, and more preferably 5 to 30 parts by mass, based on the solids content of the cellulose starting material taken as 100 parts by mass. The ozone treatment temperature is preferably 0 to 50° C., and more preferably 20 to 50° C. The ozone treatment time is not particularly limited, and is about 1 to 360 minutes, and preferably about 30 to 360 minutes. When the ozone treatment conditions are within these ranges, excessive oxidation and decomposition of cellulose can be prevented, and the yield of oxidized cellulose increases. After the ozone treatment, an additional oxidation treatment may be optionally performed using an oxidizing agent. The oxidizing agent used in the additional oxidation treatment is not particularly limited. Examples include chlorine compounds, such as chlorine dioxide and sodium chlorite; and oxygen, hydrogen peroxide, persulfuric acid, and peracetic acid. For example, the additional oxidation treatment can be performed by dissolving such an oxidizing agent in water or a polar organic solvent such as alcohol to prepare an oxidizing agent solution, and immersing the cellulose starting material in the solution.

The amount of carboxyl groups in oxidized cellulose can be adjusted by controlling the reaction conditions, such as the amount of the oxidizing agent added and the reaction time.

Carboxymethylation

When carboxymethylated cellulose is used as modified cellulose in the present invention, the carboxymethylated cellulose may be produced by carboxymethylating the cellulose starting material described above by a known method using a commercially available carboxymethylating agent, or may be a commercial product. In either case, the degree of carboxymethyl group substitution per anhydroglucose unit of cellulose is preferably 0.01 to 0.50. An example of the method for producing such carboxymethylated cellulose is as follows. Cellulose is used as a starting material, and water and/or a lower alcohol is used as a solvent in an amount that is 3 to 20 times the mass of the cellulose. The lower alcohol refers to an alcohol having 5 or fewer carbon atoms. Specific examples of solvents include water, methanol, ethanol, N-propyl alcohol, isopropyl alcohol, N-butanol, isobutanol, tertiary butanol, and the like. These solvents may be used singly or in a combination of two or more as a mixed medium. When a lower alcohol having 5 or fewer carbon atoms is used in a mixed medium, the proportion of the lower alcohol is 60 to 95 mass %. As a mercerization agent, 0.5- to 20-fold moles of alkali metal hydroxide per anhydroglucose residue of the starting material is used. Specifically, the alkali metal hydroxide may be sodium hydroxide or potassium hydroxide. The starting material, a solvent, and a mercerization agent are mixed, and mercerization treatment is performed at a reaction temperature of 0 to 70° C., preferably 10 to 60° C., for a reaction time of 15 minutes to 8 hours, preferably 30 minutes to 7 hours. Thereafter, 0.05- to 10.0-fold moles of a carboxymethylating agent per glucose residue is added thereto, and an etherification reaction is performed at a reaction temperature of 30 to 90° C., preferably 40 to 80° C., for a reaction time of 30 minutes to 10 hours, preferably 1 to 4 hours.

In the present specification, "carboxymethylated cellulose," which is a type of modified cellulose used for preparing the cellulose nanofibers (B), refers to carboxymethylated cellulose that maintains at least a part of its fibrous shape, even when dispersed in water. Thus, the carboxymethylated cellulose is distinguished from carboxymethyl cellulose, which is a water-soluble polymer, mentioned as an example of the dispersant (A) in the present specification. When an aqueous dispersion of carboxymethylated cellulose is observed with an electron microscope, a fibrous substance can be observed. In contrast, no fibrous substance is observed in an aqueous dispersion of carboxymethyl cellulose, which is a water-soluble polymer. Further, a peak of cellulose type I crystals can be observed when carboxymethylated cellulose is measured by X-ray diffraction. However, no cellulose type I crystals are observed in carboxymethyl cellulose, which is a water-soluble polymer.

Phosphorylation

As chemically modified cellulose, phosphorylated cellulose can be used. The cellulose is obtained by a method of mixing a powder or aqueous solution of phosphoric acid compound P with the cellulose starting material described above or a method of adding an aqueous solution of phosphoric acid compound P to a slurry of the cellulose starting material.

Examples of the phosphoric acid compound P include phosphoric acid, polyphosphoric acid, phosphorous acid, phosphonic acid, polyphosphonic acid, and esters thereof. These may be in salt form. Of these, a compound having a phosphate group is preferable because it is low in cost and easy to handle, and improves defibration efficiency by introducing a phosphate group into cellulose in pulp fibers. Examples of the compound having a phosphate group includes phosphoric acid, sodium dihydrogen phosphate, disodium hydrogen phosphate, trisodium phosphate, sodium pyrophosphate, sodium metaphosphate, potassium dihydrogen phosphate, dipotassium hydrogen phosphate, tripotassium phosphate, potassium pyrophosphate, potassium metaphosphate, ammonium dihydrogen phosphate, diammonium hydrogen phosphate, triammonium phosphate, ammonium pyrophosphate, ammonium metaphosphate, and the like. These may be used singly, or in a combination of two or more. Of these, phosphoric acid, sodium salt of phosphoric acid, potassium salt of phosphoric acid, and ammonium salt of phosphoric acid are more preferable due to high efficiency of introduction of a phosphate group, ease of defibration in the defibration step described later, and ease of industrial application. Sodium dihydrogen phosphate and disodium hydrogen phosphate are particularly preferable. Further, the phosphoric acid compound P is preferably used in the form of an aqueous solution since homogeneity of the reaction increases and the efficiency of introduction of a phosphate group increases. The pH of an aqueous solution of the phosphoric acid compound P is preferably 7 or less from the standpoint of increasing the efficiency of introduction of a phosphate group, and is preferably 3 to 7 from the standpoint of suppressing hydrolysis of pulp fibers.

An example of the method for producing phosphorylated cellulose is as follows. The phosphoric acid compound P is added to a dispersion of a cellulose starting material having a solids concentration of 0.1 to 10 mass % with stirring to introduce a phosphate group into cellulose. The amount of the phosphoric acid compound P added is preferably 0.2 to 500 parts by mass, and more preferably 1 to 400 parts by mass as the phosphorus element amount, based on the cellulose starting material taken as 100 parts by mass. An amount of the phosphoric acid compound P equal to or higher than the above lower limit further improves the yield of fine fibrous cellulose. However, an amount of the phosphoric acid compound P higher than the upper limit is not preferable in terms of cost because the yield improvement effect reaches a limit.

In the production of phosphorylated cellulose, a powder or aqueous solution of compound Q may be mixed in addition to the cellulose starting material and the phosphoric acid compound P. The compound Q is not particularly limited, and is preferably a nitrogen-containing compound that exhibits basicity. The "basicity" is defined as a property in which the aqueous solution exhibits pink to red in the presence of a phenolphthalein indicator, or a property in which the aqueous solution has a pH higher than 7. The nitrogen-containing compound that exhibits basicity used in the present invention is not particularly limited as long as the effects of the present invention are ensured, and is preferably an amino group-containing compound. Examples include, but are not particularly limited to, urea, methylamine, ethylamine, trimethylamine, triethylamine, monoethanolamine, diethanolamine, triethanolamine, pyridine, ethylenediamine, hexamethylenediamine, and the like. Of these, urea is preferable because it is low in cost and easy to handle. The amount of the compound Q added is preferably 2 to 1000 parts by mass, and more preferably 100 to 700 parts by mass, per 100 parts by mass of the solids content of the cellulose starting material. The reaction temperature is preferably 0 to 95° C., and more preferably 30 to 90° C. The reaction time is not particularly limited and is about 1 to 600 minutes, and preferably 30 to 480 minutes. When the esterification reaction conditions are within these ranges, cellulose can be prevented from being excessively esterified and easily dissolved, and the yield of phosphorylated cellulose increases. After the obtained phosphorylated cellulose suspension is dehydrated, it is preferable to perform a heat treatment at 100 to 170° C. from the standpoint of suppressing hydrolysis of cellulose. Further, it is preferable that heating is performed at preferably 130° C. or lower, more preferably 110° C. or lower, while water is present in the heat treatment, and after removing water, heating is performed at 100 to 170° C.

The degree of phosphate group substitution per glucose unit of phosphorylated cellulose is preferably 0.001 to 0.40. The introduction of a phosphate group (substituent) into cellulose causes the cellulose to electrically repel each other. Thus, cellulose into which a phosphate group is introduced can be easily defibrated to a nano level. If the degree of phosphate group substitution per glucose unit is smaller than 0.001, the cellulose cannot be sufficiently defibrated to a nano level. If the degree of phosphate group substitution per glucose unit is greater than 0.40, nanofibers may not be obtained due to swelling or dissolution. To perform defibration efficiently, it is preferable that the phosphorylated cellulose starting material obtained in the above-mentioned manner is boiled, and then washed with cold water.

Cationization

As chemically modified cellulose, cellulose obtained by further cationizing the carboxylated cellulose described above can be used. The cationically modified cellulose can be obtained by reacting the carboxylated cellulose starting material with a cationizing agent, such as glycidyltrimethylammonium chloride, 3-chloro-2-hydroxypropyl trialkylammonium halide, or a halohydrin thereof, and an alkali metal hydroxide (e.g., sodium hydroxide or potassium hydroxide) as a catalyst, in the presence of water or an alcohol having 1 to 4 carbon atoms.

The degree of cation substitution per glucose unit is preferably 0.02 to 0.50. The introduction of a cationic substituent into cellulose causes the cellulose to electrically repel each other. Thus, cellulose into which a cationic substituent is introduced can be easily defibrated to a nano level. If the degree of cation substitution per glucose unit is smaller than 0.02, the cellulose cannot be sufficiently defibrated to a nano level. If the degree of cation substitution per glucose unit is greater than 0.50, nanofibers may not be obtained due to swelling or dissolution. To perform defibration efficiently, it is preferable that the cationically modified cellulose starting material obtained in the above-mentioned manner is washed. The degree of cation substitution can be adjusted by the amount of a cationizing agent to be reacted, and the composition ratio of water or an alcohol having 1 to 4 carbon atoms.

In the present invention, when anionically modified cellulose obtained by anionically modifying the cellulose starting material is in salt form, any type of salt can be used; however, it is preferable to select a salt that is excellent in defibration and dispersibility, such as a sodium salt or ammonium salt.

Defibration

In the present invention, the device used for defibration is not particularly limited. It is preferable to apply a strong shear force to the aqueous dispersion using a device such as a high-speed rotary type, colloid mill type, high-pressure type, roll mill type, or ultrasonic type device. In particular, in order to perform defibration efficiently, it is preferable to use a wet high-pressure or ultrahigh-pressure homogenizer capable of applying a pressure of 50 MPa or more to the aqueous dispersion and applying a strong shear force. The pressure is preferably 100 MPa or more, and more preferably 140 MPa or more. A pretreatment may be performed for the CNF using a known mixing, stirring, emulsifying, and dispersing device, such as a high-speed shear mixer, if necessary, before a defibration or dispersion treatment with a high-pressure homogenizer. The number of times of treatment (pass) with the defibration device may be once, or twice or more, and is preferably twice or more.

In the dispersion treatment, the modified cellulose is generally dispersed in a solvent. The solvent is not particularly limited as long as it can disperse the modified cellulose. Examples include water, organic solvents (e.g., hydrophilic organic solvents such as methanol), and mixed solvents thereof. Since the cellulose starting material is hydrophilic, the solvent is preferably water.

The solids concentration of the modified cellulose in the dispersion is not particularly limited. The lower limit is generally 0.1 mass % or more, preferably 0.2 mass % or more, and more preferably 0.3 mass % or more. Due to this, the amount of liquid is appropriate for the amount of the cellulose fiber material, which is efficient. The upper limit is generally 10 mass % or less, and preferably 6 mass % or less. This makes it possible to maintain fluidity.

A pretreatment may be performed, if necessary, before the defibration treatment or the dispersion treatment. The pretreatment may be performed using a mixing, stirring, emulsifying, and dispersing device, such as a high-speed shear mixer.

When the modified cellulose nanofibers obtained through the defibration step are in salt form, they may be used as they are; or they can be subjected to, for example, an acid treatment using mineral acid or a method using a cation exchange resin, and used in acid form. Further, hydrophobicity may be imparted by a method using a cationic additive.

A modifier may be added to the cellulose nanofibers (B) used in the present invention. For example, for anionically modified cellulose nanofibers, a modifier, such as a nitrogen-containing compound, phosphorus-containing compound, or onium ion, may be bonded to anionic groups on the surface of the cellulose nanofibers to change properties such as polarity, thereby adjusting the affinity to a solvent or the dispersibility of the effect pigment (C).

When cellulose nanofibers in acid form are present in anionically modified cellulose nanofibers obtained by defibrating anionically modified cellulose, the dispersibility of the effect pigment (C) may become poor. In that case, a basic compound, such as sodium hydroxide or ammonium, may be appropriately added to convert the cellulose nanofibers to salt form. In the effect paint for automobiles of the present invention, anionically modified cellulose nanofibers are preferably in metal salt form, and more preferably in sodium salt form, from the standpoint of metallic or pearly luster of the obtained coating film. When the effect paint for automobiles of the present invention is used in applications that require water resistance, it is preferable to use, for example, anionically modified cellulose nanofibers in ammonium salt form. The reason therefor is that ammonia volatilizes upon drying, and the nanofibers become an acid form, making the coating film water resistant.

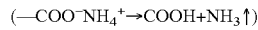
($-COO^-NH_4^+ \rightarrow COOH + NH_3 \uparrow$)

The content of the cellulose nanofibers (B) in the effect paint for automobiles of the present invention is, on a solids basis, preferably 0.1 to 97 mass-, more preferably 0.5 to 80 mass %, even more preferably 1 to 60 mass %, and particularly preferably 3 to 40 mass %, per 100 parts by mass of the total solids content in the effect paint for automobiles, from the standpoint of obtaining a coating film with excellent metallic or pearly luster.

Effect Pigment (C)

Examples of the effect pigment (C) in the effect paint for automobiles of the present invention include vapor deposition metal flake pigments, aluminum flake pigments, interference pigments, and the like. One or a combination of two or more of these pigments can be suitably selected for use, depending on the texture desired for the obtained coating film. From the standpoint of obtaining a coating film with excellent metallic luster, vapor deposition metal flake pigments and aluminum flake pigments are preferable. From the standpoint of obtaining a coating film with excellent pearly luster, interference pigments are preferable. The effect pigment (C) is preferably in the form of flakes.

The vapor deposition metal flake pigment is obtained by vapor-depositing a metal film on a base material, peeling the base material, and then grinding the vapor deposition metal film. Examples of the base material include films and the like.

The material of the above metal is not particularly limited. Examples include aluminum, gold, silver, copper, brass, titanium, chromium, nickel, nickel chromium, stainless steel, and the like. Of these, aluminum or chromium is particularly preferable, from the standpoint of, for example, availability and convenience in handling. In the present specification, a vapor deposition metal flake pigment obtained by vapor-depositing aluminum refers to a "vapor deposition aluminum flake pigment," and a vapor deposition metal flake pigment obtained by vapor-depositing chromium refers to a "vapor deposition chromium flake pigment."

The vapor deposition metal flake pigment for use may be a vapor deposition metal flake pigment formed from a single layer of a vapor deposition metal film, or a vapor deposition metal flake pigment formed from a multilayer composed of a vapor deposition metal film and additional other metal or metal oxide.

The vapor deposition aluminum flake pigment is preferably surface-treated with silica from the standpoint of, for example, obtaining a coating film excellent in storage stability and metallic luster.

Examples of commercial products that can be used as the vapor deposition aluminum flake pigment include "META-LURE" series (trade name, produced by Eckart), "Hydroshine WS" series (trade name, produced by Eckart), "Decomet" series (trade name, produced by Schlenk), "Metasheen" series (trade name, produced by BASF), and the like.

Examples of commercial products that can be used as the vapor deposition chromium flake pigment include "Metalure Liquid Black" series (trade name, produced by Eckart) and the like.

The average thickness of the vapor deposition metal flake pigment is preferably 0.01 to 1.0 μm, and more preferably 0.015 to 0.1 μm.

From the standpoint of forming a dense metallic coating film that exhibits high gloss in highlight, with lower graininess, the vapor deposition metal flake pigment preferably has an average particle size (D50) of 1 to 50 μm, and more preferably 5 to 20 μm.

"Average particle size (D50)" as used herein refers to the median size in a volume-based particle size distribution measured by laser diffraction scattering with a Microtrac MT3300 particle size distribution analyzer (trade name, produced by Nikkiso Co., Ltd.). "Thickness" as used herein is defined as the average value determined by measuring the thickness using image processing software while observing the cross-sectional surface of a coating film that contains the effect pigment with a microscope, and calculating the average value of 100 or more particles.

The aluminum flake pigment is typically produced by crushing and grinding aluminum using a grinding aid in a ball mill or attritor mill, in the presence of a grinding liquid medium. Grinding aids for use in the production step of the aluminum flake pigment include higher fatty acids, such as oleic acid, stearic acid, isostearic acid, lauric acid, palmitic acid, and myristic acid; as well as aliphatic amines, aliphatic amides, and aliphatic alcohols. Grinding liquid media for use include aliphatic hydrocarbons, such as a mineral spirit.

The aluminum flake pigment is broadly categorized into leafing-type aluminum flake pigments and non-leafing-type aluminum flake pigments, according to the type of grinding aid. From the standpoint of forming a dense metallic coating film that exhibits excellent water resistance, high gloss in highlight, and lower graininess, a non-leafing-type flake-aluminum pigment is preferably used in the effect paint for automobiles of the present invention. The non-leafing-type flake-aluminum pigments for use may be those whose surface is not particularly treated; those whose surface is coated with a resin; those whose surface is treated with silica; or those whose surface is treated with phosphoric acid, molybdic acid, or a silane coupling agent. The non-leafing-type flake-aluminum pigment for use may be a non-leafing-type flake-aluminum pigment subjected to one or several of these surface treatments.

The aluminum flake pigment for use may be a colored aluminum pigment prepared by coating the surface of an aluminum flake pigment with a color pigment, and further coating it with a resin; or a colored aluminum pigment prepared by coating the surface of an aluminum flake pigment with a metal oxide such as iron oxide.

From the standpoint of forming a dense metallic coating film that exhibits high gloss in highlight, with lower graininess, the aluminum flake pigment preferably has an average particle size (D50) of 1 to 100 μm, more preferably 5 to 50 μm, and particularly preferably 7 to 30 μm. The aluminum flake pigment preferably has a thickness of 0.01 to 1.0 μm, and particularly preferably 0.02 to 0.5 μm.

From the standpoint of water resistance and paint stability, the effect pigment (C) in the effect paint for automobiles of the present invention is preferably a combination of the vapor deposition metal flake pigment and the aluminum flake pigment. In this case, the ratio (mass ratio) of the vapor deposition metal flake pigment to the aluminum flake pigment is suitably 9/1 to 1/9, and preferably 2/8 to 8/2.

The interference pigment for use is preferably an interference pigment prepared by coating a transparent or translucent base material with titanium oxide. In the present specification, the transparent base material refers to a base material through which at least 90% of visible light transmits. The translucent base material refers to a base material through which at least 10% to less than 90% of visible light transmits.

Interference pigments refer to effect pigments prepared by coating the surface of a transparent or translucent flaky base material, such as mica, synthetic mica, glass, iron oxide, aluminum oxide, and various metal oxides, with a metal oxide that has a refractive index different from that of the base material. Examples of metal oxides include titanium oxide, iron oxide, and the like. Interference pigments can develop a variety of different interference colors depending on the difference of the thickness of the metal oxide.

Specifically, examples of interference pigments include the following metal oxide-coated mica pigments, metal oxide-coated alumina flake pigments, metal oxide-coated glass flake pigments, metal oxide-coated silica flake pigments, and the like.

Metal oxide-coated mica pigments contain natural mica or synthetic mica as a base material, and are pigments prepared by coating the surface of the base material with a metal oxide. Natural mica is a flaky base material obtained by pulverizing mica from ore. Synthetic mica is synthesized by heating an industrial material, such as $SiO_2$, $MgO$, $Al_2O_3$, $K_2SiF_6$, or $Na_2SiF_6$, to melt the material at a high temperature of about 1500° C.; and cooling the melt for crystallization. When compared with natural mica, synthetic mica contains a smaller amount of impurities, and has a more uniform size and thickness. Specific examples of synthetic mica base materials include fluorophlogopite ($KMg_2AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), LiNa taeniolite ($LiMg_2LiSi_4O_{10}F_2$), and the like.

Metal oxide-coated alumina flake pigments are pigments obtained by coating the surface of an alumina flake base material with a metal oxide. Alumina flakes refer to flaky (thin) aluminum oxides, which are clear and colorless. Alumina flakes do not necessarily consist of only aluminum oxide, and may contain other metal oxides.

Metal oxide-coated glass flake pigments are pigments obtained by coating the surface of a flaky glass base material with a metal oxide. The metal oxide-coated glass flake pigments have a smooth base material surface, which causes intense light reflection.

Metal oxide-coated silica flake pigments are pigments obtained by coating flaky silica, a base material having a smooth surface and a uniform thickness, with a metal oxide.

The interference pigment may be surface-treated in order to improve, for example, dispersibility, water resistance, chemical resistance, and weatherability.

From the standpoint of obtaining a coating film with excellent pearly luster, the interference pigment preferably has an average particle size of 5 to 30 μm, and particularly preferably 7 to 20 μm.

From the standpoint of obtaining a coating film with excellent pearly luster, the interference pigment preferably has a thickness of 0.05 to 1 μm, and particularly preferably 0.1 to 0.8 μm.

From the standpoint of forming a dense coating film with metallic or pearly luster that exhibits high gloss in highlight and lower graininess, the effect pigment (C) for use in the effect paint for automobiles of the present invention preferably has an average particle size of 1 to 100 μm, more preferably 5 to 50 μm, and particularly preferably 7 to 30 μm. The effect pigment (C) preferably has a thickness of 0.01 to 1.0 μm, and particularly preferably 0.02 to 0.5 μm.

From the standpoint of obtaining a coating film with excellent metallic or pearly luster, the content of the effect pigment (C) in the effect paint for automobiles of the present invention is, on a solids basis, preferably 2 to 97 mass %, particularly preferably 5 to 65 mass %, and even more preferably 10 to 60 mass %, per 100 parts by mass of the total solids content in the effect paint for automobiles.

Other Components

The effect paint for automobiles of the present invention may further contain other components in addition to water, the dispersant (A), the cellulose nanofibers (B), and the effect pigment (C), if necessary. Examples of the components include rheology control agents other than the cellulose nanofibers (B), pigments other than the effect pigment (C), binder resins, crosslinkable components, wetting agents, organic solvents, ultraviolet absorbers, light stabilizers, basic compounds, and the like.

Rheology Control Agent Other than Cellulose Nanofibers (B)

From the standpoint of, for example, water resistance and metallic or pearly luster of the obtained coating film, the effect paint for automobiles of the present invention may contain a rheology control agent other than the cellulose nanofibers (B). Examples of usable rheology control agents other than the cellulose nanofibers (B) include polyamide-based rheology control agents, mineral-based rheology control agents, polyacrylic acid-based rheology control agents, and the like.

Examples of polyamide-based rheology control agents include polyamide amine salts, fatty acid polyamide, and the like.

Examples of mineral-based rheology control agents include swelling laminar silicate that has a 2:1-type crystalline structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; and vermiculite; substitution products and derivatives thereof; and mixtures thereof.

Examples of polyacrylic acid-based rheology control agents include sodium polyacrylate, polyacrylic acid-(meth)acrylic acid ester copolymers, and the like.

Examples of commercial products of polyacrylic acid-based rheology control agents include "Primal ASE-60," "Primal TT615," and "Primal RM5" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like. The acid value of the solids content of the polyacrylic acid-based rheology control agent for use is 30 to 300 mg KOH/g, and preferably 80 to 280 mg KOH/g.

When the effect paint for automobiles of the present invention contains a rheology control agent other than the cellulose nanofibers (B), the content of the rheology control agent is, on a solids basis, preferably 1 to 200 parts by mass, and more preferably 50 to 150 parts by mass, per 100 parts by mass of the solids content of the cellulose nanofibers (B).

Pigment Other than Effect Pigment (C)

The effect paint for automobiles of the present invention may contain a pigment other than the effect pigment (C).

Examples of usable pigments other than the effect pigment (C) include color pigments, extender pigments, and the like.

Examples of color pigments include titanium oxide, zinc oxide, carbon black, molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, and the like.

Examples of extender pigments include clay, kaolin, barium sulfate, barium carbonate, calcium carbonate, talc, silica, alumina white, and the like.

The pigments other than the effect pigment (C) may be used singly, or in a combination of two or more.

Binder Resin

From the standpoint of, for example, water resistance of the obtained coating film, the effect paint for automobiles of the present invention may contain a binder resin.

Examples of binder resins include acrylic resins, polyester resins, alkyd resins, urethane resins, and the like. The binder resin preferably contains a crosslinkable functional group, such as hydroxyl, carboxyl, or epoxy.

When the effect paint for automobiles of the present invention contains a binder resin, the content of the binder resin is preferably 0.01 to 500 parts by mass, more preferably 5 to 300 parts by mass, and even more preferably 10 to 200 parts by mass, per 100 parts by mass of the effect pigment (C).

From the standpoint of, for example, water resistance of the obtained coating film, it is also preferable to use an aqueous resin dispersion as at least one type of the binder resin.

As the aqueous resin dispersion, a dispersion of a resin in an aqueous solvent can be used. The aqueous resin dispersion may contain, for example, at least one member selected from the group consisting of an aqueous urethane resin dispersion, an aqueous acrylic resin dispersion, an aqueous polyester resin dispersion, an aqueous olefin resin dispersion, and a composite of these resins. The aqueous resin dispersion may be modified.

Of these, from the standpoint of water resistance of the obtained coating film, an aqueous urethane resin dispersion and an aqueous acrylic resin dispersion are preferable, and an aqueous hydroxy-containing urethane resin dispersion and an aqueous hydroxy-containing acrylic resin dispersion are more preferable.

The aqueous hydroxy-containing acrylic resin dispersion is particularly preferably a core-shell dispersion.

When the effect paint for automobiles of the present invention contains an aqueous resin dispersion, the content of the aqueous resin dispersion is preferably 1 to 60 parts by mass, and more preferably 10 to 40 parts by mass, per 100 parts by mass of the total solids content in the effect paint for automobiles.

Crosslinkable Component

From the standpoint of waterproof adhesion of the obtained coating film, the effect paint for automobiles of the present invention may further contain a crosslinkable component.

When the effect paint for automobiles contains the binder resin, the crosslinkable component is a component for crosslinking and curing the binder resin by heating. When the effect paint for automobiles does not contain the binder resin, the crosslinkable component may be a self-crosslinkable component. The crosslinkable component may be a component for crosslinking and curing part of a colored paint for forming a colored coating film described later, or part of a clear paint for forming a clear coating film described later. Examples of crosslinkable components include amino resins, urea resins, polyisocyanate compounds, blocked polyisocyanate compounds, polyisocyanate compounds blocked with active methylene compounds, epoxy-containing compounds, carboxy-containing compounds, carbodiimide group-containing compounds, hydrazide group-containing compounds, semicarbazide group-containing compounds, silane coupling agents, and the like. Of these, amino resins reactive with a hydroxyl group, polyisocyanate compounds, blocked polyisocyanate compounds, and carbodiimide group-containing compounds reactive with a carboxyl group are preferable. The polyisocyanate compounds and blocked polyisocyanate compounds for use can be those described later in the section "Clear Paint." The crosslinkable components may be used singly, or in a combination of two or more.

When the effect paint for automobiles of the present invention contains a crosslinkable component, the content of the crosslinkable component is, on a solids basis, preferably 1 to 100 parts by mass, more preferably 5 to 95 parts by mass, and even more preferably 10 to 90 parts by mass, per 100 parts by mass of the effect pigment (C) in the effect paint for automobiles of the present invention, from the standpoint of, for example, water resistance of the obtained coating film.

When the effect paint for automobiles of the present invention contains a binder resin and/or a crosslinkable component, the total content of the binder resin and crosslinkable component is, on a solids basis, preferably 0.1 to 500 parts by mass, more preferably 1 to 300 parts by mass, and even more preferably 10 to 100 parts by mass, per 100 parts by mass of the solids content of the effect pigment (C) in the effect paint for automobiles, from the standpoint of metallic or pearly luster and waterproof adhesion of the obtained coating film.

Wetting Agent

From the standpoint of, for example, metallic or pearly luster of the obtained coating film, the effect paint for automobiles of the present invention may further contain a wetting agent.

The wetting agent can be any wetting agent that aids in uniformly orientating the effect paint for automobiles on a substrate, when the effect paint for automobiles is applied to the substrate.

Materials that have such an effect are also referred to as "wetter," "leveling agent," "surface-adjusting agent," "antifoaming agent," "surfactant," "super wetter," or the like, as well as wetting agent. The wetting agent includes a wetter, a leveling agent, a surface-adjusting agent, an antifoaming agent, a surfactant, and a super wetter.

The amount of the wetting agent in the effect paint for automobiles of the present invention is, on a solid basis, preferably 4 to 400 parts by mass, more preferably 5 to 100 parts by mass, and even more preferably 8 to 60 parts by mass, per 100 parts by mass of the solids content of the effect pigment (C).

Examples of wetting agents include silicone-based wetting agents, acrylic-based wetting agents, vinyl-based wetting agents, fluorine-based wetting agents, and acetylene diol-based wetting agents. These wetting agents may be used singly, or in a combination of two or more.

From the standpoint of obtaining an effect paint for automobiles that exhibits excellent water resistance, that can form metallic or pearly luster, and that further exhibits higher stability, the wetting agent for use is preferably acetylene diol-based wetting agent and/or a wetting agent having an ethylene oxide chain.

In particular, the wetting agent for use is preferably an ethylene oxide adduct of acetylene diol.

Examples of commercial products of the wetting agent include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), and Surfynol series (produced by Evonik Industries AG).

Examples of silicone-based wetting agents include polydimethylsiloxane and modified silicone obtained by modifying polydimethylsiloxane. Examples of modified silicone include polyether-modified silicone, acrylic-modified silicone, and polyester-modified silicone.

From the standpoint of excellent metallic or pearly luster of the obtained multilayer coating film, the content of the wetting agent in the effect paint for automobiles of the present invention is, on a solids basis, preferably 0.01 to 20 parts by mass, more preferably 0.02 to 15 parts by mass, and even more preferably 0.05 to 10 parts by mass, per 100 parts by mass of the solids content of the effect paint for automobiles.

From the standpoint of metallic or pearly luster of the obtained coating film, the effect paint for automobiles of the present invention preferably has a solids content of 0.1 to 10 parts by mass, more preferably 0.5 to 9 parts by mass, and even more preferably 1 to 8 parts by mass, per 100 parts by mass of all of the components of the effect paint for automobiles.

In particular, from the standpoint of metallic or pearly luster of the obtained coating film, the effect paint for automobiles of the present invention contains water, the dispersant (A), the cellulose nanofibers (B), the effect pigment (C), and the wetting agent, and has a solids content of preferably 0.1 to 10 parts by mass, more preferably 0.5 to 9 parts by mass, and even more preferably 1 to 8 parts by mass, per 100 parts by mass of all of the components of the effect paint for automobiles.

Viscosity

In the present specification, viscosity is defined as the viscosity 1 minute after the start of measurement under predetermined conditions. Specifically, a prepared effect paint for automobiles is placed in a predetermined container and mixed by stirring with a rotary stirrer with the rotational speed set to 1000 revolutions per minute, until the effect paint becomes homogeneous. Thereafter, the viscosity 1 minute after the start of revolution as measured with a Brookfield viscometer at 6 revolutions per minute (6 rpm) at a temperature of 20° C. ("B6 value" in the present specification) is measured. The viscometer used in this case is a Brookfield viscometer (trade name: LVDV-I, produced by Brookfield). The rotational speed of 6 rpm is a typical condition for controlling the viscosity of pseudoplastic fluid.

From the standpoint of metallic or pearly luster of the obtained coating film, the viscosity (B6 value) of the effect paint for automobiles of the present invention as measured at a rotational speed of 6 revolutions per minute (6 rpm) is preferably 100 to 10000 mPa·sec, more preferably 200 to 8000 mPa·sec, and even more preferably 400 to 6000 mPa·sec.

Further, from the standpoint of obtaining a coating film with excellent metallic or pearly luster, the viscosity of the effect paint for automobiles of the present invention 1 minute after the start of revolution as measured with a Brookfield viscometer at 60 revolutions per minute (60 rpm) at a temperature of 20° C. ("B60 value" in the present specification) is preferably 30 to 2000 mPa·s, more preferably 40 to 1800 mPa·s, and even more preferably 50 to 1500 mPa·s. The viscometer used in this measurement is a Brookfield viscometer (trade name: LVDV-I, produced by Brookfield).

Ti Value

The "Ti value" (thixotropic index) as used in the present specification refers to the value described in JIS K5101-6-2 (2004), Pigment Test Method, Section 2, Rotational Viscometer Method; and can be determined by measuring the viscosity (mPa·s) at 20° C. at 6 rpm and 60 rpm using a Brookfield viscometer, and calculating the value determined by "the viscosity measured at 6 rpm/viscosity measured at 60 rpm (B6 value/B60 value)." From the standpoint of metallic or pearly luster of the obtained coating film, the Ti value is preferably 1.5 to 10, more preferably 2 to 9, and even more preferably 2.5 to 8. A Ti value of 1.5 or more is preferable from the standpoint of the unlikeliness of occurrence of precipitation of the pigment, and a Ti value of 10 or less is preferable from the standpoint of reducing aggregation of the pigment.

Method for Forming Multilayer Coating Film

Since a coating film with excellent metallic or pearly luster can be formed using the effect paint for automobiles of the present invention, the effect paint for automobiles of the present invention is preferably used as an aqueous base-coat paint. In particular, the effect paint for automobiles of the present invention can be suitably used in a method for forming a multilayer coating film, comprising applying a colored paint to a substrate to form a colored coating film, applying the effect paint for automobiles of the present invention to the formed cured or uncured colored coating film to form an effect coating film, and applying a clear paint to the formed cured or uncured effect coating film to form a clear coating film.

A base coating film formed from a base paint that may be transparent may also be formed between the colored coating film and the effect coating film.

Specifically, the method for forming a multilayer coating film of the present invention may comprise, for example, the steps of stacking coating films in the following order.

A method for forming a multilayer coating film (1): a substrate, a colored coating film, an effect coating film, a clear coating film A method for forming a multilayer coating film (2): a substrate, a colored coating film, a base coating film that may be transparent, an effect coating film, a clear coating film In the method for forming a multilayer coating film (1), it is preferred that the colored coating film, the effect coating film, and the clear coating film each are stacked by a wet-on-wet technique, and that these three layers are cured simultaneously.

In the method for forming a multilayer coating film (2), it is preferred that after being formed, the colored coating film is cured; that, afterward, the base coating film that may be transparent, the effect coating film, and the clear coating film each are stacked by a wet-on-wet technique; and that these three layers are cured simultaneously.

Substrate

The multilayer coating film of the present invention is formed on a substrate shown below. Examples of substrates include exterior panel parts of automobile bodies, such as passenger cars, trucks, and buses; automobile parts; and the like. Examples of materials of substrates include metal materials including metals, such as iron, zinc, and aluminum and alloys containing at least one of these metals; molded products of at least one of these metals; molded products of, for example, glass or plastic (including plastic foam); plastic films; and the like. Degreasing treatment or surface treatment can be suitably performed depending on the material to obtain a substrate. Examples of surface treatments include phosphate treatment, chromate treatment, composite oxide treatment, and the like. When the material of the substrate is metal, it is preferred that an undercoating film is formed on a surface-treated metal material using, for example, a cationic electrodeposition paint. In particular, the undercoating film is preferably a cured coating film, and more preferably a coating film obtained by curing a coating film that is formed using, for example, a cationic electrodeposition paint.

When the material of the substrate is plastic, it is preferred that a primer coating film is formed on a degreased plastic material using a primer paint.

Colored Paint

Specifically, the colored paint for use can be a known thermosetting paint that contains a base resin, a crosslinking agent, a pigment, and a solvent such as an organic solvent and/or water, as main components. Examples of thermosetting paints include intermediate paints, base paints, and the like.

Examples of base resins for use in the colored paint include thermosetting resins, room-temperature-curable resins, and the like. However, from the standpoint of, for example, water resistance, chemical resistance, and weatherability, thermosetting resins are preferable for use.

From the standpoint of weatherability and transparency, the base resin is preferably, for example, an acrylic resin, a polyester resin, an epoxy resin, or an urethane resin.

Examples of acrylic resins include resins obtained by copolymerizing an $\alpha,\beta$-ethylenically unsaturated carboxylic acid, a (meth)acrylic acid ester having a functional group, such as a hydroxyl group, an amide group, a methylol group, or an epoxy group, other (meth)acrylic acid ester, styrene, and the like.

Examples of polyester resins include polyester resins obtained by a condensation reaction of a polyhydric alcohol, such as ethylene glycol, propylene glycol, butylene glycol, 1,6-hexanediol, trimethylolpropane, or pentaerythritol, with a polyvalent carboxylic acid component, such as adipic acid, isophthalic acid, terephthalic acid, phthalic anhydride, hexahydrophthalic anhydride, or trimellitic anhydride.

Examples of epoxy resins include bisphenol A-type epoxy resins produced by a condensation reaction of bisphenol A with epichlorohydrin.

Examples of urethane resins include compounds obtained by an addition reaction of a diisocyanate compound with a polyhydric alcohol, and urethane resins whose molecular weight is increased by reacting an acrylic resin, a polyester resin, or an epoxy resin as described above with a diisocyanate compound.

The colored paint may be an aqueous paint, or a solvent-based paint. From the standpoint of decreasing the VOCs of the paint, the colored paint is preferably an aqueous paint. When the colored paint is an aqueous paint, the base resin for use can be a resin that contains hydrophilic groups (e.g., a carboxyl group, a hydroxyl group, a methylol group, an amino group, a sulfonate group, and a polyoxyethylene bond; most typically a carboxyl group) in an amount sufficient to solubilize or disperse the resin in water. By neutralizing the hydrophilic groups to form the system into an alkali salt, the base resin can be solubilized or dispersed in water. The amount of hydrophilic groups, for example, carboxyl groups, in doing this is not particularly limited, and can be freely determined depending on the solubility or dispersity in water. The amount of hydrophilic groups is typically about 10 mg KOH/g or more, and preferably 30 to 200 mg KOH/g, based on the acid value. Examples of alkaline substances for use in neutralization include sodium hydroxide, amine compounds, and the like.

The resin can be dispersed in water by subjecting the polymerizable component to emulsion polymerization in the presence of a surfactant and a water-soluble resin. The aqueous dispersion of the resin can also be obtained by dispersing the resin in water in the presence of, for example, an emulsifier. In the case of resin dispersion in water, the base resin may be completely free of hydrophilic groups; or may contain hydrophilic groups in an amount smaller than that of the water-soluble resin described above.

The crosslinking agent is used for crosslinking and curing the base resin by heating, and the crosslinking agent for use can be those listed as the crosslinkable component in the explanation of the effect paint for automobiles of the present invention.

The ratio of the components in the colored paint may be freely selected, as required. However, from the standpoint of, for example, water resistance and appearance, it is typically preferred that the ratio of the base resin is 60 to 90 mass %, and particularly 70 to 85 mass %, based on the total mass of both components; and that the ratio of the crosslinking agent is 10 to 40 mass %, and particularly 15 to 30 mass %, based on the total mass of both components.

The pigment imparts a color and undercoat hiding power to the colored coating film formed from the colored paint. The type and amount of the pigment can be suitably adjusted depending on the hue or lightness desired for the multilayer coating film. For example, by adjusting the type and amount of the pigment, the lightness L* value of the coating film obtained from the colored paint can be adjusted so as to fall within the range of 0.1 to 90, preferably 0.1 to 70, and more preferably 0.1 to 60. Examples of pigments include metallic pigments, rust preventive pigments, color pigments, extender pigments, and the like. Of these, color pigments are preferably used; from the standpoint of obtaining a coating film with excellent undercoat hiding power and metallic luster, black pigments are more preferably used. The type and amount of the pigment in the colored paint are preferably adjusted so that the L* of the colored coating film falls within the above ranges.

The thickness of the cured colored coating film obtained from the colored paint is preferably 3 μm to 50 μm, more preferably 5 to 45 μm, and even more preferably 8 to 40 μm from the standpoint of, for example, undercoat hiding power and the metallic luster of the multilayer coating film. For example, the thickness of the cured colored coating film is 15 μm to 50 μm, preferably 18 to 45 μm, and more preferably 20 to 40 μm.

The colored paint can be applied by a typical method. When the colored paint is an aqueous paint, for example, deionized water and optionally additives, such as a thickener and an antifoaming agent, are added to the colored paint so that the solids content is adjusted to about 30 to 70 mass % and the viscosity is adjusted to 500 to 6000 cps/6 rpm (Brookfield viscometer). Then, the adjusted paint is applied to the surface of a substrate by spray coating, rotary atomization coating, or the like. An electrostatic charge may optionally be applied during the coating process.

The film thickness having hiding power of color of the colored paint (X) is preferably 80 μm or less, more preferably 10 to 60 μm, and even more preferably 15 to 50 μm from the standpoint of, for example, color stability. In the present specification, the "film thickness having hiding power of color" refers to a value determined in the following manner. A monochrome checker-patterned, hiding-chart specified in section 4.1.2 of JIS K5600-4-1 is attached to a steel plate. Then, a paint is applied by inclined coating so that the film thickness continuously varies, and is dried or cured. The coating surface is then visually observed under diffused daylight, and the minimum film thickness in which the monochrome border of the checker of the hiding-chart disappears is measured by an electromagnetic film thickness meter.

When the effect paint for automobiles of the present invention is applied to an uncured coating film formed from the colored paint as in the method for forming a multilayer coating film (1), the effect paint for automobiles of the present invention may be applied after the applied colored paint is allowed to stand at room temperature for 15 to 30 minutes, or heated at a temperature of 50 to 100° C. for 30 seconds to 10 minutes.

When the colored coating film is cured as in the method for forming a multilayer coating film (2), the heating temperature is preferably 110 to 180° C., and particularly preferably 120 to 160° C. The time period for heating treatment is preferably 10 to 60 minutes, and particularly preferably 15 to 40 minutes.

Base Paint that May be Transparent

The base paint that may be transparent (simply "base paint" below) for use may be a known paint composition. In particular, the base paint for use is preferably a paint composition typically used in coating, for example, automobile bodies.

The base paint is preferably a paint that contains a base resin, a curing agent, and a medium composed of water and/or an organic solvent.

The base resin and curing agent for use may be known compounds commonly used in the art.

The base resin is preferably a resin excellent in, for example, weatherability and transparency. Specifically, the base resin includes acrylic resins, polyester resins, epoxy resins, and urethane resins.

Examples of acrylic resins include $\alpha,\beta$-ethylenically unsaturated carboxylic acids; (meth)acrylic acid esters having a functional group such as a hydroxyl group, an amide group, or a methylol group; other (meth)acrylic acid esters; and resins obtained by copolymerizing a monomer component, such as styrene.

The polyester resins for use may be those obtained by subjecting a polybasic acid, polyhydric alcohol, or modified oil to condensation reaction by an ordinary method.

Examples of epoxy resins include epoxy resins obtained by a method in which an epoxy ester is synthesized by a reaction of an epoxy group with an unsaturated fatty acid, and an $\alpha,\beta$-unsaturated acid is added to this unsaturated group; or by a method in which the hydroxyl group of an epoxy ester and a polybasic acid, such as phthalic acid or trimellitic acid, are esterified.

Examples of urethane resins include urethane resins obtained by reacting at least one diisocyanate compound selected from the group consisting of aliphatic diisocyanate compounds, alicyclic diisocyanate compounds, and aromatic diisocyanate compounds with at least one polyol compound selected from the group consisting of polyether polyols, polyester polyols, and polycarbonate polyols; and urethane resins obtained by reacting the acrylic resin, polyester resin, or epoxy resin with a dipolyisocyanate compound, and increasing the molecular weight of the reaction product.

The base paint may be an aqueous paint, or a solvent-based paint. However, from the standpoint of decreasing the VOCs of the paint, the base paint is preferably an aqueous paint. When the base paint is an aqueous paint, the base resin for use can be a resin that contains hydrophilic groups (e.g., a carboxyl group, a hydroxyl group, a methylol group, an amino group, a sulfonate group, and a polyoxyethylene group; most preferably a carboxyl group) in an amount sufficient to solubilize or disperse the resin in water. By neutralizing the hydrophilic groups to form the system into an alkali salt, the base resin can be solubilized or dispersed in water. The amount of hydrophilic groups, for example, carboxyl groups, in doing this is not particularly limited, and can be freely determined depending on the solubility or dispersity in water. The amount of hydrophilic groups is typically about 10 mg KOH/g or more, and preferably 30 to 200 mg KOH/g, based on the acid value. Examples of alkaline substances for use in neutralization include sodium hydroxide and amine compounds.

The resin can be dispersed in water by subjecting the monomer component to emulsion polymerization in the presence of a surfactant and an optional water-soluble resin. The aqueous dispersion of the resin can also be obtained by dispersing the resin in water in the presence of, for example, an emulsifier. In this case of resin dispersion in water, the base resin may be completely free of hydrophilic groups; or may contain hydrophilic groups in an amount smaller than that of the water-soluble resin described above.

The curing agent is for use in crosslinking and curing the base resin by heating. Examples include amino resins, polyisocyanate compounds (including unblocked polyisocyanate compounds and blocked polyisocyanate compounds), epoxy group-containing compounds, carboxy-containing compounds, carbodiimide group-containing compounds, hydrazide group-containing compounds, and semicarbazide group-containing compounds. Of these, amino resins and polyisocyanate compounds, which are reactive with hydroxyl groups, and carbodiimide group-containing compounds, which are reactive with carboxyl groups, are preferable. These crosslinking agents may be used singly, or in a combination of two or more.

Specifically, amino resins obtained by condensation or co-condensation of, for example, melamine, benzoguanamine, or urea with formaldehyde; or amino resins obtained by further etherifying such amino resins with a lower monohydric alcohol, are suitably used. Additionally, polyisocyanate compounds are also suitably used.

The proportion of each component of the base paint can be freely determined, as required. However, from the standpoint of, for example, water resistance and appearance, it is preferred that the proportion of the base resin be typically 50 to 90 mass %, and particularly 60 to 85 mass %, based on the total mass of the base resin and crosslinking agent; and that the proportion of the curing agent be typically 10 to 50 mass %, and particularly 15 to 40 mass %, based on the total mass of the base resin and crosslinking agent.

For the base paint, an organic solvent may optionally be used. Specifically, organic solvents typically used in paint are usable. Examples of organic solvents include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; and ketones, such as methyl ethyl ketone, methyl isobutyl ketone, cyclohexanone, and isophorone. These organic solvents may be used singly, or in a combination of two or more.

The base paint may contain, for example, a color pigment, an extender pigment, an effect pigment, an ultraviolet absorber, an antifoaming agent, a rheology control agent, a basic compound, a rust inhibitor, and a surface-adjusting agent, as necessary, in addition to the components described above.

The base paint is preferably a transparent paint or a colored paint. From the standpoint of obtaining a coating film excellent in metallic or pearly luster, the base paint is preferably a transparent paint.

A base paint being a transparent paint indicates that a 35-μm-thick film obtained by applying a base paint has a haze value of 25% or less on a dry film basis. In the present invention, "haze value" is defined as a value determined by applying a base paint to a smooth PTFE plate, curing the paint, measuring the peeled coating film with a COH-300A turbidimeter (trade name, produced by Nippon Denshoku Industries Co., Ltd.), and calculating the haze value from the measured diffuse light transmittance (DF) and parallel light transmittance (PT) using the following formula (1).

$$\text{Haze Value} = 100 \cdot DF/(DF+PT) \tag{1}$$

When the base paint is a transparent paint, the base paint may optionally contain an extender pigment. Examples of extender pigments include barium sulfate, barium carbonate, calcium carbonate, aluminum silicate, silica, magnesium carbonate, talc, and alumina white.

When an extender pigment is added, the amount of the extender pigment is preferably 0.1 to 30 parts by mass, and more preferably 0.1 to 20 parts by mass, per 100 parts by mass of the resin solids content in the base paint.

When the base paint is a colored paint, the base paint contains a color pigment. From the standpoint of light transmission control, the base paint may contain a color pigment, such as titanium oxide and carbon black; and may further optionally contain a known color pigment, other than titanium oxide and carbon black. The color pigment is not particularly limited. Specifically, one pigment, or a combination of two or more pigments can be selected from, for example, composite metal oxide pigments (e.g., iron oxide pigments and titanium yellow), azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxane pigments, threne pigments, indigo pigments, or effect pigments. The effect pigments include examples listed in the "Colored Paint" section.

When the base paint contains a color pigment, the amount of the color pigment is preferably 0.1 to 50 parts by mass, and more preferably 0.2 to 40 parts by mass, per 100 parts by mass of the resin solids content in the base paint.

The base coating film obtained from the base paint has a thickness of preferably 3 μm or more, more preferably 3 to 20 μm, and still more preferably 5 to 15 μm on a cured film basis, from the standpoint of smoothness and metallic luster.

The base paint can be applied by a typical method. Examples include methods such as air spray coating, airless spray coating, and rotary-atomization coating. When applying the base paint, electrostatic charge may optionally be applied. Of such methods, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the base paint be adjusted to have a solids content and a viscosity suitable for coating by adding water and/or an organic solvent, and optional additives such as a rheology control agent and an antifoaming agent.

The base paint has a solids content of preferably 10 to 60 mass %, more preferably 15 to 55 mass %, and still more preferably 20 to 50 mass. The base paint has a viscosity of preferably 200 to 7000 cps, more preferably 300 to 6000 cps, and still more preferably 500 to 5000 cps, as measured with a Brookfield viscometer at 20° C. and at 6 rpm.

Coating with Effect Paint for Automobiles

The effect paint for automobiles according to the present invention can be applied by a method, such as electrostatic coating, air spray, or airless spray. In these coating methods, electrostatic charges may optionally be applied. In the method for forming a multilayer coating film according to the present invention, rotary-atomization electrostatic coating is particularly preferable.

The film thickness 1 minute after the effect paint for automobiles according to the present invention is adhered to the substrate is preferably 3 to 100 μm, more preferably 4 to 80 µm, and still more preferably 5 to 60 µm, from the standpoint of obtaining a coating film with excellent metallic luster.

A clear paint can be applied after the effect paint for automobiles is applied and allowed to stand at room temperature for 15 to 30 minutes, or after the effect paint is applied and heated at a temperature of 50 to 100° C. for 30 seconds to 10 minutes.

The thickness of the film formed from the effect paint for automobiles according to the present invention is preferably 0.02 to 40 µm, more preferably 0.05 to 30 µm, and still more preferably 0.1 to 25 µm on a dry film basis.

Additionally, when the effect paint for automobiles according to the present invention contains solids in an amount of 0.1 to 10 parts by mass, preferably 0.5 to 9 parts by mass, and more preferably 1 to 8 parts by mass, per 100 parts by mass of the total components of the effect paint for automobiles, the thickness of the effect coating film formed from the effect paint for automobiles is, on a dry film basis, preferably 0.02 to 7 µm, more preferably 0.1 to 4 µm, and still more preferably 0.15 to 3 µm. When the effect paint for automobiles contains 0.01 to 0.2 µm of a vapor deposition metal flake pigment and/or an aluminum flake pigment, the effect coating film formed from the effect paint for automobiles has a thickness of preferably 0.02 to 3.5 µm, and more preferably 0.08 to 3 µm on a dry film basis.

In the method for forming a multilayer coating film according to the present invention, a clear paint can be applied to an effect coating film obtained by applying the effect paint for automobiles, thus forming a clear coating film.

Clear Paint

The clear paint for use may be any known thermosetting clear-coat paint composition. Examples of thermosetting clear-coat paint compositions include organic solvent-based thermosetting paint compositions containing a base resin having a crosslinkable functional group and a curing agent; aqueous thermosetting paint compositions containing a base resin having a crosslinkable functional group and a curing agent; and powdery thermosetting paint compositions containing a base resin having a crosslinkable functional group and a curing agent.

Examples of crosslinkable functional groups present in the base resin include carboxyl groups, hydroxyl groups, epoxy groups, and silanol groups. Examples of the type of base resin include acrylic resins, polyester resins, alkyd resins, urethane resins, epoxy resins, and fluororesins. Examples of curing agents include polyisocyanate compounds, blocked polyisocyanate compounds, melamine resins, urea resins, carboxy-containing compounds, carboxy-containing resins, epoxy-containing resins, and epoxy-containing compounds.

The combination of a base resin and a curing agent in the clear paint is, for example, preferably a combination of a carboxy-containing resin and an epoxy-containing resin, a combination of a hydroxy-containing resin and a polyisocyanate compound, a combination of a hydroxy-containing resin and a blocked polyisocyanate compound, and a combination of a hydroxy-containing resin and a melamine resin.

The clear paint may be a one-component paint or a multiple-component paint, such as a two-component paint. In particular, the clear paint is preferably a two-component clear paint containing the hydroxy-containing resin and the polyisocyanate compound described below, from the standpoint of the adhesion of the obtained coating film.

Hydroxy-Containing Resin

The hydroxy-containing resin for use may be a known resin that has a hydroxyl group, without any limitation. Examples of hydroxy-containing resins include hydroxy-containing acrylic resins, hydroxy-containing polyester resins, hydroxy-containing polyether resins, and hydroxy-containing polyurethane resins; preferably hydroxy-containing acrylic resins and hydroxy-containing polyester resins; and particularly preferably hydroxy-containing acrylic resins.

The hydroxy-containing acrylic resin has a hydroxy value of preferably 80 to 200 mg KOH/g, and more preferably 100 to 180 mg KOH/g, from the standpoint of scratch resistance and water resistance of the coating film.

The hydroxy-containing acrylic resin has a weight average molecular weight of preferably 2500 to 40000, and more preferably 5000 to 30000, from the standpoint of acidity resistance and smoothness of the coating film.

In the present specification, the weight average molecular weight refers to a value calculated from a chromatogram measured by gel permeation chromatography based on the molecular weight of standard polystyrene. For the gel permeation chromatography, HLC8120GPC (produced by Tosoh Corporation) was used. The measurement was conducted using the four columns TSKgel G-4000HXL, TSKgel G-3000HXL, TSKgel G-2500HXL, and TSKgel G-2000HXL (trade names, all produced by Tosoh Corporation) under the conditions of mobile phase: tetrahydrofuran, measuring temperature: 40° C., flow rate: 1 cc/min, and detector: RI.

The glass transition temperature of the hydroxy-containing acrylic resin is preferably −40° C. to 20° C., and particularly preferably −30° C. to 10° C. A glass transition temperature of −40° C. or more leads to sufficient coating film hardness. A glass transition temperature of 20° C. or less enables the coating film to maintain smoothness of the coating surface.

Polyisocyanate Compound

A polyisocyanate compound is a compound having at least two isocyanate groups per molecule. Examples include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl) benzene (common name: tetramethylxylylene diisocyanate) or mixtures thereof; and aromatic-aliphatic triisocyanates, such as 1,3,5-triisocyanatomethylbenzene.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of derivatives of polyisocyanates include dimers, trimers, biurets, allophanates, urethodiones, urethoimines, isocyanurates, oxadiazinetriones, polymethylene polyphenyl polyisocyanates (crude MDI, polymeric MDI), or crude TDI of the polyisocyanates described above. The polyisocyanate derivatives may be used singly, or in a combination of two or more.

These polyisocyanates and derivatives thereof may be used singly, or in a combination of two or more.

Of the aliphatic diisocyanates, hexamethylene diisocyanate-based compounds are preferably used; and of the alicyclic diisocyanates, 4,4'-methylenebis(cyclohexyl isocyanate) is preferably used. Of these, in particular, derivatives of hexamethylene diisocyanate are most preferable, from the standpoint of, for example, adhesion and compatibility.

The polyisocyanate compound for use may also be a prepolymer that is formed by reacting the polyisocyanate or a derivative thereof with a compound having an active hydrogen group (e.g., a hydroxyl or amino group), reactive with the polyisocyanate, in the presence of an excessive amount of isocyanate groups. Examples of compounds reactive with the polyisocyanate include polyhydric alcohols, low-molecular-weight polyester resins, amines, and water.

The polyisocyanate compound for use may be a blocked polyisocyanate compound in which some or all of the isocyanate groups of the polyisocyanate or a derivative thereof are blocked with a blocking agent.

Examples of blocking agents include phenols, such as phenol, cresol, xylenol, nitrophenol, ethylphenol, hydroxydiphenyl, butylphenol, isopropylphenol, nonylphenol, octylphenol, and methyl hydroxybenzoate; lactams, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, amide acetate, amide stearate, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamic acid esters, such as phenyl N-phenylcarbamate; imines, such as ethyleneimine and propyleneimine; sulfites, such as sodium bisulfite and potassium bisulfite; and azole-based compounds. Examples of azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Blocking (reacting with a blocking agent) can be performed by optionally adding a solvent. The solvent for use in blocking reaction is preferably not reactive with isocyanate groups. Examples of solvents include ketones, such as acetone and methyl ethyl ketone; esters, such as ethyl acetate; and N-methyl-2-pyrrolidone (NMP).

The polyisocyanate compounds may be used singly, or in a combination of two or more.

In the present invention, the equivalent ratio of the hydroxyl groups in the hydroxy-containing resin to the isocyanate groups in the polyisocyanate compound (OH/NCO) is preferably 0.5 to 2.0, and more preferably 0.8 to 1.5, from the standpoint of, for example, curability and scratch resistance of the coating film.

When a two-component clear paint containing a hydroxy-containing resin and a polyisocyanate compound is used as a clear paint, the hydroxy-containing resin and the polyisocyanate compound are preferably separate, from the standpoint of storage stability; they are mixed and prepared into a two-component paint immediately before use.

The clear paint for use may be a one-component paint. The combination of the base resin and the curing agent in such a one-component paint includes a combination of a carboxy-containing resin and an epoxy-containing resin, a combination of a hydroxy-containing resin and a blocked polyisocyanate compound, and a combination of a hydroxy-containing resin and a melamine resin.

The clear paint may further optionally contain additives, such as a solvent (e.g., water and an organic solvent), a curing catalyst, an antifoaming agent, and an ultraviolet absorber.

The clear paint may suitably contain a color pigment in such an amount that transparency is not impaired. The color pigment may be a single pigment known for use in ink or paints, or a combination of two or more of such pigments. Although the amount of the color pigment can be suitably determined, the amount of the color pigment is 30 parts by mass or less, and preferably 0.01 to 10 parts by mass, per 100 parts by mass of the vehicle-forming resin composition in the clear paint (Z).

The form of the clear paint is not particularly limited. The clear paint for use is typically an organic solvent-based paint composition. Examples of organic solvents for use in this case include various organic solvents for paints, such as aromatic or aliphatic hydrocarbon solvents, ester solvents, ketone solvents, and ether solvents. The organic solvent for use may be the solvent used in the preparation of, for example, the hydroxy-containing resin; or other organic solvents may be further added.

The clear paint has a solids concentration of preferably about 30 to 70 mass %, and more preferably about 40 to 60 mass %.

The clear paint is applied to the effect coating film. The method for applying the clear paint is not particularly limited, and the clear paint can be applied by the same method as that for the colored paint. For example, the clear paint can be applied by a coating method, such as air spray coating, airless spray coating, rotary-atomization coating, or curtain coating. In these coating methods, electrostatic charges may optionally be applied. Of these methods, rotary-atomization coating using electrostatic charges is preferable. Typically, the amount of the applied clear paint is preferably an amount that results in a cured film thickness of about 10 to 50 μm.

Moreover, when the clear paint is applied, it is preferable to suitably adjust the viscosity of the clear paint to fall within a viscosity range suitable for the coating method. For example, for rotary-atomization coating using electrostatic charges, it is preferable to suitably adjust the viscosity of the clear paint using a solvent (e.g., organic solvent) so as to fall within a range of about 15 to 60 seconds as measured with a Ford cup No. 4 viscometer at 20° C.

In the method for forming a multilayer coating film according to the present invention, an uncured colored coating film, an uncured effect coating film, and an uncured clear coating film can be simultaneously cured by heating these three coating films. Heating can be performed by a known means. For example, a drying furnace, such as a hot air furnace, an electric furnace, or an infrared induction heating furnace, can be used. A suitable heating temperature is within the range of 70 to 150° C., and preferably 80 to 140° C. The heating time is not particularly limited; and is preferably 10 to 40 minutes, and more preferably 20 to 30 minutes.

Multilayer Coating Film and Evaluation of Various Properties

The present invention encompasses a multilayer coating film that includes a colored coating film formed from a colored paint; an effect coating film that is formed from an effect paint for automobiles according to the present invention and that is formed on the colored coating film; and a clear coating film that is formed from a clear paint and that is formed on the effect coating film. The colored paint, the effect paint for automobiles according to the present invention, the clear paint, and a method for forming a multilayer coating film are as described above. The three uncured coating films, which are a colored coating film, an effect coating film, and a clear coating film, can be cured simultaneously by heating. Alternatively, after a colored coating film is formed and cured, a base coating film that may be transparent, an effect coating film, and a clear coating film can be formed on the cured colored coating film; and then these three uncured coating films can be cured simultaneously by heating. Alternatively, after a colored coating film, a base coating film that may be transparent, an effect coating film, and a clear coating film are formed, these four uncured coating films can be cured simultaneously by heating.

60-Degree Specular Gloss (60 Degree Gloss)

From the standpoint of the metallic or pearly luster of the resulting coating film, the effect paint for automobiles according to the present invention is applied to a colored coating film or to a colored coating film and a base coating film that may be transparent, so as to give a thickness of 0.1 to 4 μm on a dry film basis, thereby forming an effect coating film; and a clear coating film is further formed on the effect coating film, thereby forming a multilayer coating film, which has a 60-degree specular gloss of preferably 90 to 240, more preferably 90 to 220, and still more preferably 90 to 200.

The present invention determines the 60-degree specular gloss of a multilayer coating film prepared by further stacking a clear coating film on an effect coating film prepared so as to give a thickness of 0.1 to 4 μm on a dry coating film basis. However, this does not mean that the 60-degree specular gloss is always within the above ranges when the thickness of the effect coating film is any value within the range of 0.1 to 4 μm; rather, this means that the 60-degree specular gloss is within the above ranges, while the thickness of the effect coating film is a value within the range of 0.1 to 4 μm.

The specular gloss refers to a ratio of specular reflection from the surface of an object to specular reflection light from a reference surface (glass with a refractive index of 1.567), and is a value defined by JIS-Z8741. Specifically, specular gloss is determined in the following manner: a luminous flux of a predetermined aperture angle is allowed to enter the surface of a measurement sample at a predetermined incident angle, and a luminous flux of a predetermined aperture angle reflected in the direction of specular reflection is measured with an optical receiver; i.e., specular gloss is a value measured with a "glossmeter." In the present specification, the specular gloss is defined as a 60-degree specular gloss (60 degree gloss) measured with a glossmeter (micro-TRI-gloss, produced by BYK-Gardner). A greater value of the 60-degree specular gloss indicates a higher gloss of the coating film.

In an embodiment, a multilayer coating film prepared as described below has a 60-degree specular gloss of preferably 130 to 240, more preferably 135 to 235, and still more preferably 140 to 230, from the standpoint of the denseness of the metallic coating film: the multilayer coating film is prepared by applying the effect paint for automobiles according to the present invention that contains a vapor deposition metal flake pigment as an effect pigment (C) and that also contains 0.1 to 10 parts by mass of solids per 100 parts by mass of the total components of the effect paint for automobiles to a colored coating film or a colored coating film and a base coating film that may be transparent to give a thickness of 0.1 to 4 μm on a dry film basis, in order to form an effect coating film; and further forming a transparent clear coating film thereon.

Graininess

The present invention determines the HG value of a multilayer coating film prepared by further stacking a clear coating film on an effect coating film prepared so as to give a thickness of 0.1 to 4 μm on a dry coating film basis. However, this does not meant that the HG value always within the above ranges when the thickness of the effect coating film is any value within the range of 0.1 to 4 μm; rather, the HG value is determined as being within the above ranges, while the thickness of the effect coating film is a value within the range of 0.1 to 4 μm.

In an embodiment, a multilayer coating film prepared as described below has an HG value of preferably 10 to 55, more preferably 10 to 50, and still more preferably 10 to 48, from the standpoint of the denseness of the metallic coating film. The multilayer coating film is prepared by applying the effect paint for automobiles according to the present invention that contains a vapor deposition metal flake pigment and/or an aluminum flake pigment as an effect pigment (C) and that also contains 0.1 to 10 parts by mass of solids per 100 parts by mass of the total components of the effect paint for automobiles to a colored coating film or to a colored coating film and a base coating film that may be transparent to give a thickness of 0.1 to 4 μm on a dry film basis, in order to form an effect coating film of the effect paint for automobiles; and further forming a transparent clear coating film thereon.

In another embodiment, a multilayer coating film prepared as described below has an HG value of preferably 10 to 65, more preferably 10 to 63, and still more preferably 10 to 60, from the standpoint of the denseness of the metallic coating film. The multilayer coating film is prepared by applying the effect paint for automobiles according to the present invention that contains an interference pigment as an effect pigment (C) and that also contains 0.1 to 10 parts by mass of solids per 100 parts by mass of the total components of the effect paint for automobiles to a colored coating film or to a colored coating film and a base coating film that may be transparent to give a thickness of 0.1 to 4 μm on a dry film basis, in order to form an effect coating film of the effect paint for automobiles; and further forming a transparent clear coating film thereon.

The graininess is indicated by a hi-light graininess value (abbreviated as "HG value" below). The HG value is a parameter of microscopic brilliance, which is a texture, obtained by microscopic observation, and indicates the graininess in the highlight (observation of a coating film from near the specular reflection light with respect to incident light). The HG value is calculated as follows. First, the coating film is photographed with a CCD camera at a light incidence angle of 15° and a light receiving angle of 0°, and the obtained digital image data (i.e., two-dimensional luminance distribution data) is subjected to a two-dimensional Fourier transform to obtain a power spectrum image. Subsequently, only the spatial frequency domain that corresponds to graininess is extracted from the power spectrum image, and the obtained measurement parameter is converted to an HG value from 0 to 100 so as to have a linear relation with graininess. Specifically, the HG value can be measured with a microscopic brilliance-measuring device.

HG is determined by the following formula.
If IPSL≥0.32, HG=500·IPSL−142.5
If 0.32>IPSL 0.15, HG=102.9·IPSL−15.4
If 0.15>IPSL, HG=0
IPSL (integration of power spectrum of low frequency) is determined by the following formula.

$$IPSL = \int\int P(\nu,\theta)d\nu d\theta P(0,0)$$

P (ν, θ) represents a power spectrum obtained by performing two-dimensional Fourier transform on the two-dimensional luminance distribution data generated from acquired image data. ν represents a spatial frequency. θ represents an angle. 0 to N represent a spatial frequency domain that correspond to graininess.

The details of the measurement method are found in Research on Coatings (Kansai Paint Technical Report), No. 138, August 2002, pp. 8 to 24; and in Research on Coatings (Kansai Paint Technical Report), No. 132, April, 1999, pp. 22 to 35. A lower HG value of graininess indicates less graininess on the surface of the coating film.

The present invention can also employ the following configurations.

Item 1. An effect paint for automobiles, comprising water, a dispersant (A), cellulose nanofibers (B), and an effect pigment (C).

Item 2. The effect paint for automobiles according to Item 1, wherein the dispersant (A) is an anionic polymer compound.

Item 3. The effect paint for automobiles according to Item 2, wherein the anionic polymer compound is a carboxy-containing polymer compound or a phosphate group-containing polymer compound.

Item 4. The effect paint for automobiles according to Item 2 or 3, wherein the anionic polymer compound is a carboxy-containing polymer compound or a phosphate group-containing polymer compound.

Item 5. The effect paint for automobiles according to any one of Items 1 to 4, wherein the effect paint comprises the dispersant (A) in an amount of 0.01 to 25 parts by mass, per 100 parts by mass of the effect pigment (C).

Item 6. The effect paint for automobiles according to any one of Items 1 to 4, wherein the effect paint comprises the dispersant (A) in an amount of 0.1 to 10 parts by mass, per 100 parts by mass of the effect pigment (C).

Item 7. The effect paint for automobiles according to any one of Items 1 to 6, wherein the cellulose nanofibers (B) are anionically modified cellulose nanofibers.

Item 8. The effect paint for automobiles according to Item 7, wherein the anionically modified cellulose nanofibers are oxidized cellulose nanofibers.

Item 9. The effect paint for automobiles according to Item 7 or 8, wherein the oxidized cellulose nanofibers have a carboxyl group amount of 0.4 to 1.0 mmol/g based on the absolute dry mass of the oxidized cellulose nanofibers.

Item 10. The effect paint for automobiles according to any one of Items 1 to 9, wherein the effect pigment (C) comprises a vapor deposition metal flake pigment, an aluminum flake pigment, an interference pigment, or a combination thereof.

Item 11. The effect paint for automobiles according to any one of Items 1 to 10, wherein the effect pigment (C) comprises a vapor deposition metal flake pigment and an aluminum flake pigment.

Item 12. The effect paint for automobiles according to any one of Items 1 to 11, wherein the content of the effect pigment (C) in the effect paint is 2 to 97 mass %, on a solids basis, per 100 parts by mass of the total solids content in the effect paint for automobiles.

Item 13. The effect paint for automobiles according to any one of Items 1 to 12, further comprising an aqueous resin dispersion selected from an aqueous urethane resin dispersion, an aqueous acrylic resin dispersion, and a combination thereof.

Item 14. The effect paint for automobiles according to Item 13, wherein the content of the aqueous resin dispersion is 1 to 60 mass %, on a solids basis, per 100 parts by mass of the total solids content in the effect paint for automobiles.

Item 15. The effect paint for automobiles according to any one of Items 1 to 15, further comprising a wetting agent.

Item 16. The effect paint for automobiles according to Item 15, wherein the content of the wetting agent is 0.01 to 20 mass %, on a solids basis, per 100 parts by mass of the total solids content in the effect paint for automobiles.

Item 17. The effect paint for automobiles according to any one of Items 1 to 16, which has a solids content of 0.1 to 10 parts by mass, per 100 parts by mass of all of the components.

Item 18. A multilayer coating film comprising:
a colored coating film;
an effect coating film that is formed from the effect paint for automobiles according to any one of Items 1 to 17 and that is formed on the colored coating film; and
a clear coating film formed on the effect coating film.

Item 19. The multilayer coating film according to Item 18, wherein the effect coating film has a thickness of 0.02 to 40 μm on a dry film basis.

Item 20. The multilayer coating film according to Item 18 or 19, further comprising a base coating film that may be transparent between the colored coating film and the effect coating film.

Item 21. The multilayer coating film according to any one of Items 18 to 20, wherein the effect pigment (C) comprises a vapor deposition metal flake pigment; the effect coating film is obtained by applying the effect paint for automobiles according to Item 17 to a thickness of 0.1 to 4 μm on a dry film basis to the colored coating film or the base coating film that may be transparent; and the multilayer coating film has a 60-degree specular gloss of preferably 130 to 240, more preferably 135 to 235, and even more preferably 140 to 230.

Item 22. The multilayer coating film according to any one of Items 18 to 20, wherein the effect pigment (C) comprises a vapor deposition metal flake pigment and/or an aluminum flake pigment; the effect coating film is obtained by applying the effect paint for automobiles according to Item 17 to a thickness of 0.1 to 4 μm on a dry film basis to the colored coating film or the base coating film that may be transparent; and the multilayer coating film has an HG value of preferably 10 to 55, more preferably 10 to 50, and even more preferably 10 to 48.

Item 23. The multilayer coating film according to any one of Items 18 to 20, wherein the effect pigment (C) comprises an interference pigment; and when the effect coating film is obtained by applying the effect paint for automobiles according to Item 17 to a thickness of 0.1 to 4 μm on a dry film basis to the colored coating film or the base coating film that may be transparent, the multilayer coating film has an HG value of preferably 10 to 65, more preferably 10 to 63, and even more preferably 10 to 60.

Item 24. An automobile part comprising the multilayer coating film according to any one of Items 18 to 23 applied thereto.

Item 25. An automobile comprising the multilayer coating film according to any one of Items 18 to 23 applied thereto.

Item 26. A method for forming a multilayer coating film, comprising applying a colored paint to a substrate to form a colored coating film, applying the effect paint for automobiles according to any one of Items 1 to 17 to the formed cured or uncured colored coating film to form an effect coating film, and applying a clear paint to the formed cured or uncured effect coating film to form a clear coating film.

Item 27. The method for forming a multilayer coating film according to Item 26, wherein the three layers, i.e., the colored coating film, the effect coating film, and the clear coating film are simultaneously cured.

Item 28. The method for forming a multilayer coating film according to Item 26 or 27, wherein the substrate comprises a cured undercoating film formed thereon.

Item 29. The method according to Item 26, further comprising applying a base paint that may be transparent to the formed cured or uncured colored coating film to form a base coating film that may be transparent.

Item 30. The method according to Item 29, wherein after the colored coating film is cured, the three layers, i.e., the base film that may be transparent, the effect coating film, and the clear coating film, are simultaneously cured.

Item 31. The method according to any one of Items 26 to 30, wherein the substrate is an automobile part or an automobile.

EXAMPLES

The present invention is described below in more detail with reference to Examples and Comparative Examples. However, the present invention is not limited thereto or thereby. The parts and percentages referred to herein are by mass unless otherwise specified.

Production of Hydroxy-Containing Acrylic Resin (R-1)

Production Example 1

35 parts of propylene glycol monopropyl ether was placed in a reaction vessel equipped with a thermometer, a thermostat, a stirrer, a reflux condenser, a nitrogen inlet tube, and a dropping funnel; and heated to 85° C. A mixture of 32 parts of methyl methacrylate, 27.7 parts of n-butyl acrylate, 20 parts of 2-ethylhexyl acrylate, 10 parts of 4-hydroxybutyl acrylate, 3 parts of hydroxypropyl acrylate, 6.3 parts of acrylic acid, 1 part of 2-acryloyloxyethyl acid phosphate, 15 parts of propylene glycol monopropyl ether, and 2.3 parts of 2,2'-azobis(2,4-dimethylvaleronitrile) was added dropwise over 4 hours. After the completion of dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise over 1 hour. After the completion of dropwise addition, the mixture was aged for 1 hour. 7.4 parts of diethanolamine was further added, thereby obtaining a hydroxy-containing acrylic resin (R-1) solution with a solids content of 55%. The obtained hydroxy-containing acrylic resin (R-1) had an acid value of 51 mg KOH/g, and a hydroxy value of 52 mg KOH/g.

Production of Red Pigment Dispersion (P-1)

Production Example 2

60 parts of the hydroxy-containing acrylic resin (R-1) (solids content: 33 parts), 35 parts of Paliogen Maroon L3920 (trade name, a perylene red pigment, produced by BASF A.G.), and 177 parts of deionized water were placed in a stirring vessel. After these components were homogeneously mixed, 2-(dimethylamino)ethanol was further added to adjust the pH to 7.5. The obtained mixture was placed in a 300-ml resin bottle, and 130 parts of zirconia beads (diameter: 1.5 mm) were added thereto, followed by hermetically sealing the bottle. The mixture was dispersed for 120 minutes using a paint shaker conditioner. After the dispersion, the zirconia beads were removed by filtration through a 100-mesh metallic gauze, thus obtaining a red pigment dispersion (P-1) with a solids content of 25%.

Production of Orange Pigment Dispersion (P-2)

Production Example 3

70.9 parts of the hydroxy-containing acrylic resin (R-1) (solids content: 39 parts), 39 parts of Cosmoray Orange L2950 (trade name, a diketopyrrolopyrrole orange pigment, produced by BASF), and 241.45 parts of deionized water were placed in a stirring vessel. After these components were homogenously mixed, 2-(dimethylamino)ethanol was further added to adjust the pH to 7.5. The obtained mixture was placed in a 300-ml resin bottle, and 130 parts of zirconia beads (diameter: 1.5 mm) were added thereto, followed by hermetically sealing the bottle. The mixture was dispersed for 120 minutes using a paint shaker conditioner. After the dispersion, the zirconia beads were removed by filtration through 100-mesh metallic gauze, thus obtaining an orange pigment dispersion (P-2) with a solids content of 22.2%.

Production of Extender Pigment Dispersion (P-3)

Production Example 4

327 parts of the acrylic resin solution (R-1) (solids content: 180 parts), 360 parts of deionized water, 6 parts of Surfynol 104A (trade name, produced by Evonik Industries AG, an antifoaming agent, solids content: 50), and 250 parts of Barifine BF-20 (trade name, produced by Sakai Chemical Industry Co., Ltd., barium sulfate powder, average particle size: 0.03 μm) were placed in a paint conditioner, and a glass bead medium was added thereto. The mixture was mixed and dispersed at room temperature for 1 hour, thus obtaining an extender pigment dispersion (P-3) with a solids content of 44%.

Production of Aqueous Acrylic Resin Dispersion (R-2)

Production Example 5

128 parts of deionized water and 2 parts of Adekaria Soap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of a monomer emulsion for the core portion, which is described below, and 5.3 parts of a 6% ammonium persulfate aqueous solution were introduced into the reaction vessel, and maintained therein at 80° C. for 15 minutes. Thereafter, the remaining monomer emulsion for the core portion was added dropwise over a period of 3 hours to the reaction vessel maintained at the same temperature. After completion of the dropwise addition, the mixture was aged for 1 hour. Subsequently, a monomer emulsion for the shell portion, which is described below, was added dropwise over a period of 1 hour. After aging for 1 hour, the mixture was cooled to 30° C. while 40 parts of a 5% 2-(dimethylamino)ethanol aqueous solution was gradually added to the reaction vessel; and the mixture was filtered through a 100-mesh nylon cloth, thereby obtaining an aqueous acrylic resin dispersion (R-2) having an average particle size of 100 nm and a solids content of 30%. The obtained aqueous acrylic resin dispersion had an acid value of 33 mg KOH/g, and a hydroxy value of 25 mg KOH/g.

Monomer emulsion for the core portion: the monomer emulsion for the core portion was obtained by mixing and stirring 40 parts of deionized water, 2.8 parts of Adeka Reasoap SR-1025, 2.1 parts of methylene bisacrylamide, 2.8 parts of styrene, 16.1 parts of methyl methacrylate, 28 parts of ethyl acrylate, and 21 parts of n-butyl acrylate.

Monomer emulsion for the shell portion: the monomer emulsion for the shell portion was obtained by mixing and stirring 17 parts of deionized water, 1.2 parts of Adeka Reasoap SR-1025, 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate.

Production of Aqueous Polyester Resin Dispersion (R-3)

Production Example 6

664 parts of isophthalic acid, 496 parts of adipic acid, 237 parts of phthalic anhydride, 788 parts of neopentyl glycol, and 341 parts of trimethylolpropane were placed in a reaction vessel equipped with a stirrer, a thermometer, a device for removing reaction-generated water, and a nitrogen gas inlet tube; and heated to 160° C. with stirring in a nitrogen gas atmosphere. After the temperature was maintained at 160° C. for 1 hour, the temperature was raised to 230° C. over a period of 5 hours, while the generated condensed water was removed; and the temperature was kept at 230° C. When the acid value had reached 7 mg KOH/g, the mixture was cooled to 170° C., 490 parts of ε-caprolactone was added, and the mixture was kept at the same temperature for 1 hour. 77 parts of trimellitic anhydride was then added to this reaction product, and an addition reaction was performed at 170° C. for 30 minutes. The mixture was then cooled to 50° C. or less, and 0.88 equivalents of 2-(dimethylamino)ethanol to the acid group was added for neutralization. Deionized water was then gradually added to obtain a hydroxy-containing polyester resin (R-3) having a solids concentration of 40% and a pH of 7.5. The obtained hydroxy-containing polyester resin had a lactone modification amount of 18 mass %, a number average molecular weight of 2074, a hydroxyl value of 89 mg KOH/g, and an acid value of 23 mg KOH/g.

Production of Polyester Resin Solution (R-4)

Production Example 7

109 parts of trimethylolpropane, 141 parts of 1,6-hexanediol, 126 parts of 1,2-cyclohexanedicarboxylic anhydride, and 120 parts of adipic acid were placed in a reaction vessel equipped with a thermometer, a thermostat, a stirrer, a reflux condenser, and a water separator. The mixture was heated from 160° C. to 230° C. over a period of 3 hours, followed by a condensation reaction at 230° C. for 4 hours. Subsequently, to introduce carboxyl groups to the obtained condensation reaction product, 38.3 parts of trimellitic anhydride was added to the obtained condensation reaction product, and a reaction was allowed to proceed at 170° C. for 30 minutes. The reaction product was then diluted with 2-ethyl-1-hexanol, thus obtaining a polyester resin solution (R-4) with a solids content of 70%. The obtained hydroxy-containing polyester resin had an acid value of 46 mg KOH/g, a hydroxy value of 150 mg KOH/g, and a number average molecular weight of 1400.

Production of Transparent Base Paint (X-1)

Production Example 8

To a stirring vessel, 14 parts (on a solids basis) of the extender pigment dispersion (P-3), 40 parts (on a solids basis) of the aqueous acrylic resin dispersion (R-2), 23 parts (on a solids basis) of the polyester resin solution (R-4), 10 parts (on a solids basis) of U-Coat UX-310 (trade name, produced by Sanyo Chemical Industries, Ltd., an aqueous urethane resin dispersion, solids content: 40%), and 27 parts (on a solids basis) of Cymel 251 (trade name, produced by Nihon Cytec Industries Inc., a melamine resin, solids content: 80%) were added, and the mixture was stirred and mixed, thus preparing a transparent base paint (X-1).

Production of Transparent Base Paint (X-2)

Production Example 9

15 parts of Xirallic T60-10 Crystal Silver was mixed with 100 parts by mass (on a resin solids content basis) of the transparent base paint (X-1) to produce a transparent base paint (X-2).

Preparation of Cellulose Nanofibers (B)

Production Example 10

5.00 g (absolute dry mass) of unrefined bleached softwood kraft pulp (whiteness: 85%) was added to 500 mL of an aqueous solution in which 20 mg of TEMPO (Sigma Aldrich) (0.025 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 2.2 mmol/g to initiate an oxidation reaction. Since the pH of the system decreased during the reaction, a 3M aqueous sodium hydroxide solution was added continuously to adjust the pH to 10. The reaction was ended when the sodium hypochlorite was consumed, and when the pH of the reaction system no longer changed. After the reaction, the mixture was filtered through a glass filter to separate the pulp, and the pulp was sufficiently washed with water to obtain oxidized pulp (carboxylated cellulose). The yield of pulp at this time was 93%, the time required for completion of the oxidation reaction was 60 minutes, and the amount of carboxyl groups ("degree of modification" below) was 0.75 mmol/g. The resulting product was adjusted to 1.0% (w/v) with water, and defibration treatment was performed until the transparency was sufficiently high by using a high-pressure homogenizer, thereby obtaining an aqueous dispersion of oxidized cellulose nanofibers (B-1) having a transparency of 88%. The average fiber diameter was 4 nm, and the aspect ratio was 280. The following stability test was performed on this aqueous dispersion of oxidized cellulose nanofibers, and the viscosity before and after stirring was measured with a Brookfield viscometer. The viscosity retention rate at this time was 50%.

Stability Test on Aqueous Dispersion of Cellulose Nanofiber 210 g of the 1.0 mass % aqueous dispersion of oxidized cellulose nanofibers obtained in the Production Example was weighed and placed in a 600-mL plastic container, and then deionized water was added such that the concentration was 0.7%, followed by stirring (1000 rpm, 5 minutes), thereby obtaining 300 g of a 0.7 mass % aqueous dispersion of oxidized cellulose nanofibers. Immediately after the concentration was adjusted, the Brookfield viscosity was measured with a Brookfield viscometer at 6 rpm for 1 minute (viscosity before stirring). 300 g of the aqueous dispersion of oxidized cellulose nanofibers that was measured for Brookfield viscosity was then stirred with a disperser for 30 minutes (1000 rpm, 23° C.). Immediately after stirring for 30 minutes, the viscosity was measured with a Brookfield viscometer at 6 rpm for 1 minute (viscosity after stirring). The viscosity retention rate is determined by the following formula.

Viscosity retention rate (%)=(viscosity after stirring/viscosity before stirring)×100

Production Example 11

5.00 g (absolute dry mass) of unrefined bleached softwood kraft pulp (whiteness: 85%) was added to 500 mL of an aqueous solution in which 39 mg of TEMPO (Sigma Aldrich) (0.05 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 6.0 mmol/g to initiate an oxidation reaction. Since the pH of the system decreased during the reaction, a 3M aqueous sodium hydroxide solution was added continuously to adjust the pH to 10. The reaction was ended when the sodium hypochlorite was consumed, and when the pH of the reaction system no longer changed. After the reaction, the mixture was filtered through a glass filter to separate the pulp, and the pulp was sufficiently washed with water to obtain oxidized pulp (carboxylated cellulose). The yield of pulp at this time was 90%, the time required for completion of the oxidation reaction was 90 minutes, and the amount of carboxyl groups was 1.51 mmol/g. The resulting product was adjusted to 1.0% (w/v) with water, and defibration treatment was performed by using a high-pressure homogenizer, thereby obtaining an aqueous dispersion of oxidized cellulose nanofibers (B-2) having a transparency of 95.0%. The average fiber diameter was 3 nm, and the aspect ratio was 250. The stability test was performed on this aqueous dispersion of oxidized cellulose nanofibers, and the viscosity before and after stirring was measured with a Brookfield viscometer. The viscosity retention rate at this time was 39%.

Production Example 12

5.00 g (absolute dry mass) of unrefined bleached softwood kraft pulp (whiteness: 85%) was added to 500 mL of an aqueous solution in which 20 mg of TEMPO (Sigma Aldrich) (0.025 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 1.3 mmol/g to initiate an oxidation reaction. Since the pH of the system decreased during the reaction, a 3M aqueous sodium hydroxide solution was added continuously to adjust the pH to 10. The reaction was ended when the sodium hypochlorite was consumed, and when the pH of the reaction system no longer changed. After the reaction, the mixture was filtered through a glass filter to separate the pulp, and the pulp was sufficiently washed with water to obtain oxidized pulp (carboxylated cellulose). The yield of pulp at this time was 99%, the time required for completion of the oxidation reaction was 50 minutes, and the amount of carboxyl groups was 0.42 mmol/g. The resulting product was adjusted to 1.0% (w/v) with water, and defibration treatment was performed until the transparency was sufficiently high by using a high-pressure homogenizer, thereby obtaining an aqueous dispersion of oxidized cellulose nanofibers (B-3) having a transparency of 75.2%. The average fiber diameter was 4 nm, and the aspect ratio was 380. The stability test was performed on this aqueous dispersion of oxidized cellulose nanofibers, and the viscosity before and after stirring was measured with a Brookfield viscometer. The viscosity retention rate at this time was 88%.

Production of Dispersant (A)

Production Example 13

148 parts of water and 94 parts (5 mol %) of polyethylene glycol polypropylene glycol monoallyl ether (average number of mols of ethylene oxide added: 37, average number of mols of propylene oxide added: 253, random addition of ethylene oxide and propylene oxide) were placed in a glass reaction vessel equipped with a thermometer, a stirrer, a reflux device, a nitrogen inlet tube, and a dropping funnel. The reaction vessel was subjected to nitrogen replacement with stirring, and heated to 80° C. in a nitrogen atmosphere. Thereafter, an aqueous monomer solution prepared by mixing 35 parts (40 mol %) of methacrylic acid, 5 parts (7 mol %) of acrylic acid, 63 parts (5 mol %) of methoxy polyethylene glycol methacrylate (average number of mols of ethylene oxide added: 25), 60 parts (43 mol %) of hydroxypropyl acrylate, 8 parts of 3-mercapto propionic acid, and 165 parts of water, and a mixture solution of 3 parts of ammonium persulfate and 47 parts of water were each continuously added dropwise to the reaction vessel maintained at 80° C. over a time period of 2 hours. Further a reaction was allowed to proceed for 1 hour with the temperature maintained at 100° C., thereby obtaining an aqueous solution of a copolymer (polycarboxylic acid A) with a solids content of 36%.

Preparation of Effect Pigment Dispersion

Production Example 14

In a stirring vessel, 12 parts (solids content 1.2 parts) of Hydroshine WS-3001 (trade name, aqueous vapor deposition aluminum flake pigment, produced by Eckart, solids content: 10, internal solvent: isopropanol, average particle size D50: 13 μm, thickness: 0.05 μm, surface-treated with silica), 0.79 parts (solids content: 0.37 parts) of Alpaste EMR-B6360 (trade name, produced by Toyo Aluminium K.K., solids content: 47%, non-leafing aluminum flake, average particle size D50: 10.3 μm, thickness: 0.19 μm, surface-treated with silica), and 19.5 parts of isopropanol were mixed with stirring, thereby obtaining an effect pigment dispersion.

Preparation of Effect Paint for Automobiles

Example 1

An effect paint for automobiles (Y-1) was prepared by placing the following components in a stirring vessel to achieve the following proportions, by mixing with stirring: 76.7 parts of distilled water, 0.5 parts of the aqueous dispersion of cellulose nanofibers (B-1) on a solids basis, 0.25 parts (on a solids basis) of Dynol 604 (trade name, an acetylenediol wetting agent, produced by Evonik Industries, with ethylene oxide chains, solids content: 100%), 0.25 parts of Aron T-50 (trade name, sodium polyacrylate, solids content: produced by Toagosei Co., Ltd.) on a solids basis, 32.29 parts of the effect pigment dispersion obtained in Production Example 14, 0.14 parts (on a solids basis) of Tinuvin 479-DW (trade name, a UV absorber, produced by BASF, a hydroxyphenyltriazine UV absorber; HPT UV absorber Tinuvin 479 is included in an acrylic polymer, solids content: 40%), 0.11 parts (on a solids basis) of Tinuvin 123-DW (trade name, a light stabilizer, produced by BASF, decanedioic acid bis(2,2,6,6-tetramethyl-1-(octyloxy)-4-piperidinyl)ester; HALS Tinuvin 123 having an amino ether group is included in an acrylic polymer, solids content: 50%), 0.67 parts (on a solids basis) of the aqueous acrylic resin dispersion (R-2) obtained in Production Example 5, and 0.51 parts of octanol.

Examples 2 to 41 and Comparative Examples 1 to 8

Effect paints for automobiles (Y-2) to (Y-49) were obtained in the same manner as in Example 1, except that the formulations shown in Table 1 were used.

In Table 1, the numerical values for distilled water and solvents indicate the liquid amount; and the numerical values for the others indicate the solids content.

The following are components shown in Table 1.

Aron T-50: trade name, a dispersant, sodium polyacrylate, solids content 43%, produced by Toagosei Co., Ltd.;

Aron A30SL: trade name, a dispersant, ammonium polyacrylate, solids content 40%, produced by Toagosei Co., Ltd.;

Aron A-6114: trade name, a dispersant, carboxylic acid-based copolymer (an ammonium salt), solids content 40'%, produced by Toagosei Co., Ltd.;

Demol EP: trade name, a dispersant, high-molecular-weight polycarboxylic acid, solids content 25%, produced by Kao Corporation;

FS600LC: trade name, a dispersant, carboxy methylcellulose, powder, produced by Nippon Paper Industries Co., Ltd.;

Jeffamine® M1000: trade name, a dispersant, polyether amine, produced by Huntsman Corporation;

Disparlon AQ-330: trade name, a dispersant, polyether phosphate ester, active component 100%, produced by Kusumoto Chemicals, Ltd.;

Metalure Liquid Black: trade name, an aqueous vapor deposition chromium flake pigment, produced by Eckart, solids content: 10%, internal solvent: propylene glycol monomethyl ether, average particle size D50: 14 μm, thickness: 0.02 μm;

Xirallic T61-10 Micro Silver: trade name, a titanium oxide-coated alumina flake pigment, produced by Merck & Co., Inc., average primary particle size: about 12 μm, average thickness: about 0.3 μm);

Xirallic T60-10 Crystal Silver: trade name, a titanium oxide-coated alumina flake pigment, produced by Merck & Co., Inc., average primary particle size: about 19 μm, average thickness: about 0.4 μm;

Pyrisma M40-58 SW Ambercup Orange: trade name, an iron oxide-coated mica pigment, produced by Merck & Co., Inc., average primary particle size: about 17.1 μm, average thickness: about 0.65 μm;

TEGO Twin 4100: trade name, a silicone-based wetting agent, produced by Evonik Degussa, with ethylene oxide chains, solids content: 100%;

BYK 348: trade name, produced by BYK, a silicone-based wetting agent, produced by BYK, with ethylene oxide chains, solids content: 100%;

Surfynol 420: trade name, produced by Evonik Industries, an acetylenediol wetting agent, with ethylene oxide chains, solids content: 100%;

Surfynol 440: trade name, produced by Evonik Industries, an acetylenediol wetting agent, with ethylene oxide chains, solids content: 100%;

Surfynol 460: trade name, produced by Evonik Industries, an acetylenediol wetting agent, with ethylene oxide chains, solids content: 100%;

Surfynol 104A: trade name, produced by Evonik Industries, an acetylenediol wetting agent, with no ethylene oxide chain, solids content: 50%;

Acrysol ASE-60: trade name, produced by The Dow Chemical Company, a polyacrylic acid-based rheology control agent, solids content: 28%;

U-Coat UX-300: trade name, produced by Sanyo Chemical Industries, Ltd., an aqueous urethane resin dispersion.

TABLE 1

Table 1 (The components other than water and solvent are indicated on a solids content basis.)

| | | | Examples | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| | | Effect Paint for Automobiles | Y-1 | Y-2 | Y-3 | Y-4 | Y-5 | Y-6 | Y-7 | Y-8 | Y-9 | Y-10 | Y-11 | Y-12 | Y-13 | Y-14 | Y-15 |
| | | Distilled Water | 76.7 | 76.7 | 76.7 | 76.7 | 76.7 | 76.7 | 76.7 | 76.7 | 76.7 | 76.7 | 76.7 | 76.7 | 76.7 | 84.93 | 84.93 |
| Cellulose Nanofiber (B) | | (B-1) | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 |
| | | (B-2) | | | | | | | | | | | | | | | |
| | | (B-3) | | | | | | | | | | | | | | | |
| Wetting Agent | | Dynol604 | 0.25 | 0.25 | 0.25 | 0.25 | 0.25 | 0.25 | 025 | 0.25 | 0.25 | 0.25 | 0.25 | 0.25 | 0.25 | 0.29 | 0.29 |
| | | TEGO TWIN4100 | | | | | | | | | | | | | | | |
| | | BYK348 | | | | | | | | | | | | | | | |
| | | Surfynol420 | | | | | | | | | | | | | | | |
| | | Surfynol440 | | | | | | | | | | | | | | | |
| | | Surfynol460 | | | | | | | | | | | | | | | |
| | | Surfynol104A | | | | | | | | | | | | | | | |
| Dispersant (A) | | Aron T-50 | 0.25 | | | | | | | | | | | | | | |
| | | Polycarboxylic Acid A | | 0.5 | | | | | | | | | | | | | |
| | | Aron A30SL | | | 0.025 | | | | | | | | | | | | |
| | | Aron A-6114 | | | | 0.25 | | | | | | | | | | | |
| | | Demol EP | | | | | 0.25 | | | | | | | | | | |
| | | Tripolyphosphoric Acid | | | | | | 0.167 | | | | | | | | | |
| | | FS600LC | | | | | | | 0.167 | | | | | | | | |
| | | JEFFAMINE M1000 | | | | | | | | 0.25 | | | | | | | |
| | | Disparion AQ-330 | | | | | | | | | 0.4 | | | | | | |
| | | Hydroshine WS3001 | | | | | | | | | | 0.25 | 0.25 | 0.25 | 0.25 | 0.294 | 0.294 |
| Effect Pigment Dispersion | Effect Pigment (C) | Alpaste EMR-B6360 | 1.2 | 1.2 | 1.2 | 1.2 | 1.2 | 1.2 | 1.2 | 1.2 | 1.2 | 1.2 | | | | | |
| | | Metalure Liquid Black | 037 | 0.37 | 0.37 | 0.37 | 0.37 | 0.37 | 0.37 | 0.37 | 0.37 | 0.37 | 1.57 | 1.57 | | | |
| | | Xirallic T61-10 Micro Silver | | | | | | | | | | | | 1.57 | | | |
| | | Xirallic T60-10 Crystal Silver | | | | | | | | | | | | | 3.14 | 2.74 | 2.74 |
| | | Pyrisma M4O-58 SW A. Orange | | | | | | | | | | | | | | | |
| | Organic Solvent | Isopropanol | 19.5 | 19.5 | 19.5 | 19.5 | 19.5 | 19.5 | 19.5 | 19.5 | 19.5 | 19.5 | 19.5 | 19.5 | 19.5 | 9.79 | 9.79 |
| Color Pigment Dispersion | | Red Pigment Dispersion (P-1) | | | | | | | | | | | | | | | |
| | | Orange Pigment Dispersion (P-2) | | | | | | | | | | | | | | | |
| Rheology Control Agent | | Acrysol ASE-60 | | | | | | | | | | | | | | | |
| UV Absorber | | Tinuvin 479-DW | 0.14 | 0.14 | 0.14 | 0.14 | 0.14 | 0.14 | 0.14 | 0.14 | 0.14 | 0.14 | 0.14 | 0.14 | 0.14 | 0.156 | 0.1456 |
| Light Stabilizer | | Tinuvin 123-DW | 0.11 | 0.11 | 0.11 | 0.11 | 0.11 | 0.11 | 0.11 | 0.11 | 0.11 | 0.11 | 0.11 | 0.11 | 0.11 | 0.13 | 0.13 |
| Binder Resin | Aqueous Resin Dispersion | Aqueous Acrylic Resin Dispersion (R-2) | 0.67 | 0.67 | 0.67 | 0.67 | 0.67 | 0.67 | 0.67 | 0.67 | 0.67 | 0.67 | 0.67 | 0.67 | 0.67 | 0.79 | 0.79 |
| | | U-Coat UX-300 | | | | | | | | | | | | | | | |
| | | Aqueous Polyester Resin Dispersion (R-3) | | | | | | | | | | | | | | | |
| | | Hydroxy-Containing Acrylic Resin (R-1) | 0.51 | 0.51 | 0.51 | 0.51 | 0.51 | 0.51 | 0.51 | 0.51 | 0.51 | 0.51 | 0.51 | 0.51 | 0.51 | 0.59 | 0.59 |
| Organic Solvent | | Octanol | | | | | | | | | | | | | | | |
| | | 2-(Dimethylamino)Ethanol | | | | | | | | | | | | | | | |
| | | Solids Content/% | 2.1 | 23 | 2.0 | 2.1 | 2.1 | 2.1 | 2.1 | 2.1 | 2.3 | 2.1 | 2.1 | 2.3 | 2.8 | 3.1 | 3.1 |
| | | B6/mPa·s | 1,810 | 1,780 | 1,800 | 1,810 | 1,780 | 1,710 | 1,730 | 1,810 | 1,780 | 1,820 | 1,810 | 2,010 | 1,620 | 2,420 | 2,410 |

TABLE 1-continued

Table 1 (The components other than water and solvent are indicated on a solids content basis.)

| | | Examples | | | | | | | | | | | | | | |
|---|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 |
| | Effect Paint for Automobiles | Y-16 | Y-17 | Y-18 | Y-19 | Y-20 | Y-21 | Y-22 | Y-23 | Y-24 | Y-25 | Y-26 | Y-27 | Y-28 | Y-29 | Y-30 |
| | Distilled Water | 84.93 | 94.6 | 78.9 | 74.3 | 78.0 | 76.7 | 76.7 | 76.7 | 76.7 | 76.7 | 76.7 | 76.7 | 76.7 | 76.7 | 76.7 |
| Cellulose Nanofiber (B) | (B-1) | 0.6 | 0.5 | 0.6 | 0.4 | 0.5 | | | 0.5 | 0.5 | 0.5 | 0.5 | 0.5 | 0.5 | 0.25 | 0.5 |
| | (B-2) | | | | | | 0.5 | | | | | | | | | |
| | (B-3) | | | | | | | 0.5 | | | | | | | | |
| | Dynol604 | 0.29 | 0.24 | 0.32 | 0.22 | 0.23 | 0.25 | 0.25 | 0.25 | | | | | | | |
| | TEGO TWIN4100 | | | | | | | | | 0.25 | | | | | | |
| | BYK348 | | | | | | | | | | 0.25 | | | | | |
| | Surfynol420 | | | | | | | | | | | 0.25 | | | | |
| | Surfynol440 | | | | | | | | | | | | 0.25 | | | |
| | Surfynol460 | | | | | | | | | | | | | 0.25 | | |
| | Surfynol104A | | | | | | | | | | | | | | 0.25 | |
| Dispersant (A) | Aron T-50 | 0.294 | 0.25 | 0.323 | 0.215 | 0.23 | 0.5 | 0.25 | 0.25 | 0.25 | 0.25 | 0.25 | 0.25 | 0.25 | 0.25 | 0.25 |
| | Polycarboxylic Acid A | | | | | | | | | | | | | | | |
| | Aron A30SL | | | | | | | | | | | | | | | |
| | Aron A-6114 | | | | | | | | | | | | | | | |
| | Demol EP | | | | | | | | | | | | | | | |
| | Tripolyphosphoric Acid | | | | | | | | | | | | | | | |
| | FS600LC | | | | | | | | | | | | | | | |
| | JEFFAMINE M1000 | | | | | | | | | | | | | | | |
| Effect Pigment Dispersion | Disparion AQ-330 | | | | | | | | | | | | | | | |
| | Hydroshine WS3001 | | | 0.59 | 1.4 | 1.0 | 1.2 | 1.2 | 1.2 | 1.2 | 1.2 | 1.2 | 1.2 | 1.2 | 1.2 | 1.1 |
| Effect Pigment (C) | Alpaste EMR-B6360 | | | 0.47 | 0.31 | 0.34 | 0.37 | 0.37 | 0.37 | 0.37 | 0.37 | 0.37 | 0.37 | 0.37 | 0.37 | 0.37 |
| | Metalure Liquid Black | | | | | | | | | | | | | | | |
| | Xirallic T61-10 Micro Silver | | | | | | | | | | | | | | | |
| | Xirallic T60-10 Crystal Silver | | | | | | | | | | | | | | | |
| | Pyrisma M4O-58 SW A. Orange | | | | | | | | | | | | | | | |
| Organic Solvent | Isopropanol | 2.74 | 1.26 | 17.3 | 22.1 | 18.4 | 19.5 | 19.5 | 19.5 | 19.5 | 19.5 | 19.5 | 19.5 | 19.5 | 19.5 | 20.2 |
| | | 9.79 | 1.66 | | | 0.46 | | | | | | | | | | |
| Color Pigment Dispersion | Red Pigment Dispersion (P-1) | | 0.05 | | | | | | | | | | | | | |
| | Orange Pigment Dispersion (P-2) | | 0.78 | | | | | | | | | | | | | |
| Rheology Control Agent | Acrysol ASE-60 | | | | | | | | | | | | | | | |
| UV Absorber | Tinuvin 479-DW | 0.156 | 0.156 | 0.17 | 0.12 | 0.12 | 0.14 | 0.14 | 0.14 | 0.14 | 0.14 | 0.14 | 0.14 | 0.14 | 0.14 | |
| Light Stabilizer | Tinuvin 123-DW | 0.13 | 0.13 | 0.14 | 0.10 | 0.10 | 0.11 | 0.11 | 0.11 | 0.11 | 0.11 | 0.11 | 0.11 | 0.11 | 0.11 | |
| Binder Aqueous Resin Dispersion | Aqueous Acrylic Resin Dispersion (R-2) | 0.79 | 0.38 | 0.87 | 0.58 | 0.44 | 0.67 | 0.67 | 0.67 | 0.67 | 0.67 | 0.67 | 0.67 | 0.67 | | |
| | U-Coat UX-300 | | | | | | | | | | | | | | | 0.93 |
| | Aqueous Polyester Resin Dispersion (R-3) | | | | | | | | | | | | | | | |
| | Hydroxy-Containing Acrylic Resin (R-1) | | 0.25 | | | | | | | | | | | | | |
| Organic Solvent | Octanol | 0.59 | | 0.60 | 0.40 | 0.47 | 0.51 | 0.51 | 0.51 | 0.51 | 0.51 | 0.51 | 0.51 | 0.51 | 0.51 | 0.51 |
| | 2-(Dimethylamino)Ethanol | | | | | | | | | | | | | | 0.06 | |
| | Solids Content/% | 3.1 | 2.6 | 2.0 | 2.2 | 2.1 | 2.1 | 2.1 | 2.1 | 2.1 | 2.1 | 2.1 | 2.1 | 2.1 | 2.5 | 2.1 |
| | B6/mPa·s | 2,390 | 2,010 | 2,480 | 1,640 | 1,760 | 5,020 | 710 | 1,790 | 1,810 | 1,820 | 1,820 | 1,810 | 1,780 | 1,110 | 1,820 |

TABLE 1-continued

Table 1 (The components other than water and solvent are indicated on a solids content basis.)

| | | | | | | | | | Examples | | | | | | |
|---|---|---|---|---|---|---|---|---|---|---|---|---|---|---|---|
| | | | | 31 | 32 | 33 | 34 | 35 | 36 | 37 | 38 | 39 | 40 | 41 |
| Effect Paint for Automobiles | | | Distilled Water | Y-31 76.1 | Y-32 75.9 | Y-33 75.9 | Y-34 92.5 | Y-35 51.6 | Y-36 108.5 | Y-37 72.8 | Y-38 82.8 | Y-39 21.9 | Y-40 40.9 | Y-41 |
| | | Cellulose Nanofiber | (B-1) | 0.5 | 0.5 | 0.5 | 0.3 | 0.5 | 0.08 | 1.2 | 0.1 | 0.3 | 0.4 | 1.2 |
| | | (8) | (B-2) | | | | | | | | | | | |
| | | | (B-3) | | | | | | | | | | | |
| | | | Dynol604 | | | | | | | | | | | |
| | | | TEGO TWIN4100 | 0.26 | 0.26 | 0.26 | 0.08 | 0.52 | 0.23 | 0.29 | 0.08 | 0.52 | 0.23 | 0.29 |
| | | | BYK348 | | | | | | | | | | | |
| | | | Surfynol420 | | | | | | | | | | | |
| | | | Surfynol440 | | | | | | | | | | | |
| | | | Surfynol460 | | | | | | | | | | | |
| | | | Surfynol104A | | | | | | | | | | | |
| | | Dispersant (A) | Aron T-50 | 0.25 | 0.25 | 0.25 | 0.134 | 0.25 | 0.19 | 0.58 | 0.13 | 0.25 | 0.19 | 0.58 |
| | | | Polycarboxylic Acid A | | | | | | | | | | | |
| | | | Aron A30SL | | | | | | | | | | | |
| | | | Aron A-6114 | | | | | | | | | | | |
| | | | Demol EP | | | | | | | | | | | |
| | | | Tripolyphosphoric Acid | | | | | | | | | | | |
| | | | FS600LC | | | | | | | | | | | |
| | | | JEFFAMINE M1000 | | | | | | | | | | | |
| | | | Disparion AQ-330 | | | | | | | | | | | |
| Effect Pigment Dispersion | Effect Pigment (C) | | Hydroshine WS3001 | 1.1 | 1.1 | 1.1 | 0.35 | 2.3 | 1.0 | 1.27 | 0.35 | 2.3 | 1.0 | 1.3 |
| | | | Alpaste EMR-B6360 | 0.37 | 0.38 | 0.375 | 0.12 | 0.75 | 0.34 | 0.42 | 0.12 | 0.75 | 0.34 | 0.42 |
| | | | Metalure Liquid Black | | | | | | | | | | | |
| | | | Xirallic T61-10 Micro Silver | | | | | | | | | | | |
| | | | Xirallic T60-10 Crystal Silver | | | | | | | | | | | |
| | | | Pyrisma M4O-58 SW A. Orange | | | | | | | | | | | |
| | Organic Solvent | | Isopropanol | 20.3 | 20.4 | 20.4 | 6.3 | 40.9 | 18.3 | 23 | 3.2 | 20.2 | 9.3 | 11.6 |
| | Color Pigment Dispersion | | Red Pigment Dispersion (P-1) | | | | | | | | | | | |
| | | | Orange Pigment Dispersion (P-2) | | | | | | | | | | | |
| | Rheology Control Agent | | Acrysol ASE-60 | | | | | | | | | | | |
| | UV Absorber | | Tinuvin 479-DW | 0.14 | 0.14 | 0.14 | 0.04 | 0.28 | 0.12 | 0.15 | 0.04 | 0.28 | 0.12 | 0.15 |
| | Light Stabilizer | | Tinuvin 123-DW | 0.11 | 0.11 | 0.11 | 0.04 | 0.23 | 0.1 | 0.13 | 0.04 | 0.23 | 0.1 | 0.13 |
| Binder Resin | Aqueous Resin Dispersion | | Aqueous Acrylic Resin Dispersion (R-2) | | | | 0.11 | 1.91 | 0.62 | 0.20 | 0.11 | 1.91 | 0.62 | 0.20 |
| | | | U-Coat UX-300 | | 0.69 | 0.69 | | | | | | | | |
| | | | Aqueous Polyester Resin Dispersion (R-3) | 0.7 | | | | | | | | | | |
| | Organic Solvent | | Octanol | 0.51 | 0.51 | 0.51 | 0.2 | 1.0 | 0.5 | 0.6 | 0.2 | 1.0 | 0.5 | 0.6 |
| | | | 2-(Dimethylamino)Ethanol | | | | 0.9 | 3.8 | 1.8 | 1.8 | 1.0 | 3.1 | 2.9 | 2.9 |
| | | | Solids Content/% | 2.1 | 2.1 | 2.1 | 1,190 | 1,710 | 320 | 5,820 | 510 | 1,710 | 2,510 | 9,200 |
| | | | B6/mPa·s | 1,810 | 1,780 | 1,820 | | | | | | | | |

TABLE 1-continued

Table 1 (The components other than water and solvent are indicated on a solids content basis.)

| | | | | | | | Comparative Examples | | | | | | | |
|---|---|---|---|---|---|---|---|---|---|---|---|---|---|---|
| | | | | 1 | 2 | 3 | 4 | 5 | 6 | 7 | 8 |
| | | | Effect Paint for Automobiles | Y-42 | Y-43 | Y-44 | Y-45 | Y-46 | Y-47 | Y-48 | Y-49 |
| | | | Distilled Water | 76.7 | 76.7 | 76.7 | 75.2 | 84.9 | 84.9 | 84.9 | 76.8 |
| | Cellulose Nanofiber (8) | | (B-1) | 0.5 | 0.5 | 0.5 | 0.5 | 0.6 | 0.6 | 0.6 | |
| | | | (B-2) | | | | | | | | |
| | | | (B-3) | | | | | | | | |
| | | | Dynol604 | 0.25 | 0.25 | 0.25 | 0.25 | 0.29 | 0.29 | 0.29 | 0.25 |
| | | | TEGO TWIN4100 | | | | | | | | |
| | | | BYK348 | | | | | | | | |
| | | | Surfynol420 | | | | | | | | |
| | | | Surfynol440 | | | | | | | | |
| | | | Surfynol460 | | | | | | | | |
| | | | Surfynol104A | | | | | | | | 0.25 |
| | Dispersant (A) | | Aron T-50 | | | | | | | | |
| | | | Polycarboxylic Acid A | | | | | | | | |
| | | | Aron A30SL | | | | | | | | |
| | | | Aron A-6114 | | | | | | | | |
| | | | Demol EP | | | | | | | | |
| | | | Tripolyphosphoric Acid | | | | | | | | |
| | | | FS600LC | 1.2 | | | | | | | |
| | | | JEFFAMINE M1000 | 0.37 | | | | | | | |
| Effect Pigment Dispersion | Effect Pigment (C) | | Disparion AQ-330 | | | | | | | | |
| | | | Hydroshine WS3001 | | 1.57 | | | | | | |
| | | | Alpaste EMR-B6360 | | | 1.57 | | | | | |
| | | | Metalure Liquid Black | | | | 3.14 | | | | |
| | | | Xirallic T61-10 Micro Silver | | | | | 2.74 | | | |
| | | | Xirallic T60-10 Crystal Silver | | | | | | 2.74 | | |
| | | | Pyrisma M4O-58 SW A. Orange | | | | | | | 2.74 | |
| | Organic Solvent | | Isopropanol | 19.5 | 19.5 | 19.5 | 19.5 | 9.79 | 9.79 | 9.79 | 19.5 |
| | Color Pigment Dispersion | | Red Pigment Dispersion (P-1) | | | | | | | | |
| | | | Orange Pigment Dispersion (P-2) | | | | | | | | |
| | Rheology Control Agent | | Acrysol ASE-60 | | | | | | | | 1.00 |
| | UV Absorber | | Tinuvin 479-DW | 0.14 | 0.14 | 0.14 | 0.14 | 0.156 | 0.156 | 0.156 | 0.14 |
| | Light Stabilizer | | Tinuvin 123-DW | 0.11 | 0.11 | 0.11 | 0.11 | 0.13 | 0.13 | 0.13 | 0.11 |
| Binder Resin | Aqueous Resin Dispersion | | Aqueous Acrylic Resin Dispersion (R-2) | | | | | | | | |
| | | | U-Coat UX-300 | | | | | | | | |
| | | | Aqueous Polyester Resin Dispersion (R-3) | 0.51 | 0.51 | 0.51 | 0.51 | 0.59 | 0.59 | 0.59 | 0.51 |
| | Organic Solvent | | Octanol | | | | | | | | |
| | | | 2-(Dimethylamino)Ethanol | 1.6 | 1.6 | 1.7 | 2.3 | 2.5 | 2.5 | 2.5 | 2.9 |
| | | | Solids Content/% | 1,820 | 1,810 | 2,020 | 1,670 | 3,430 | 2,420 | 2,410 | 1,790 |
| | | | B6/mPa·s | | | | | | | | |

Preparation of Colored Paint (W)
Colored Paint (W-1)

TP-65 Dark Gray (trade name, produced by Kansai Paint Co., Ltd., a polyester resin-based solvent-based intermediate paint, L* value of the obtained coating film: 20) was used as a colored paint (W-1).

Colored Paint (W-2)

TP-65 (trade name, produced by Kansai Paint Co., Ltd., a polyester resin-based solvent-based intermediate paint, L* value of the obtained coating film: 85) was used as a colored paint (W-2).

Colored Paint (W-3)

WP-505T (trade name, produced by Kansai Paint Co., Ltd., a polyester resin-based aqueous intermediate paint, L* value of the obtained coating film: 60) was used as a colored paint (W-3).

Colored Paint (W-4)

Ascalex 2870CD-1 Dark Gray (trade name, produced by Kansai Paint Co., Ltd., an acrylic resin-based aqueous conductive primer paint for PP materials) was used as a colored paint (W-4).

Preparation of Clear Paint (Z)
Clear Paint (Z-1)

KINO6510 (trade name, produced by Kansai Paint Co., Ltd., a hydroxy/isocyanate-curable, acrylic resin/urethane resin-based two-component organic solvent-based paint) was used as a clear paint (Z-1).

Clear Paint (Z-2)

A paint obtained by adding 1.21 parts of Paliogen Maroon L3920 (trade name, produced by BASF, an organic perylene pigment) to 100 parts by mass of KINO6510 (on a solids resin content basis) was used as a clear paint (Z-2).

Clear Paint (Z-3)

Soflex 7175 clear (trade name, produced by Kansai Paint Co., Ltd., a hydroxy/isocyanate-curable, acrylic resin/urethane resin-based two-component organic solvent-based paint for PP materials) was used as a clear paint (Z-3).

Preparation of Substrates
Substrate 1

A steel plate degreased and treated with zinc phosphate (JISG3141, size: 400 mm×300 mm×0.8 mm) was coated with an Elecron GT-10 cationic electrodeposition paint (trade name: produced by Kansai Paint Co., Ltd., an epoxy-resin polyamine-based cationic resin containing a block polyisocyanate compound as a crosslinking agent) by electrodeposition such that the coated film had a film thickness of 20 μm on a cured coating film basis. The coated plate was heated at 170° C. for 20 minutes for crosslinking and curing to form an electrodeposition coating film, which was used as substrate 1.

Substrate 2

TSOP-1 (TC-6) (trade name, produced by Japan Polychem Corporation, 350 mm×10 mm×2 mm) was prepared as a plastic material. The surface of the plastic material was wiped with gauze impregnated with isopropyl alcohol to degrease the surface, and the degreased plastic material was used as substrate 2.

Preparation of Test Plates

Example 42

Step (1): The colored paint (W-1) was electrostatically applied to substrate 1 to give a cured film thickness of 25 μm using a rotary-atomization bell coater. The substrate thus coated was heated at 140° C. for 30 minutes to crosslink and cure the paint, thereby forming a colored coating film.

Step (2): Subsequently, the transparent base paint (X-1) was electrostatically applied to the colored coating film to give a cured film thickness of 10 μm using a rotary-atomization bell coater, and allowed to stand for 2 minutes.

Step (3): Further, the effect paint for automobiles (Y-1), adjusted to the coating viscosity as shown in Table 1, was applied to the coating film to give a dry film thickness of 1.0 μm at a booth temperature of 23° C. and a humidity of 68% using a Robot Bell (produced by ABB), thereby forming an effect coating film. The substrate thus coated was allowed to stand for 3 minutes, and further allowed to stand at 80° C. for 3 minutes.

Step (4): Subsequently, the clear paint (Z-1) was applied to the obtained dry coating film to give a dry film thickness of 35 μm at a booth temperature of 23° C. and a humidity of 68% using a Robot Bell (produced by ABB), thereby forming a clear coating film.

Step (5): After the application, the resulting coated substrate was allowed to stand at room temperature for 7 minutes and then heated in a hot-air circulation drying oven at 140° C. for 30 minutes to simultaneously dry the multilayers of the coating film, thus forming a test plate.

The dry film thickness of each effect coating film was calculated from the formula (2) shown below. The same applies to the following Examples.

$$x=(sc*10000)/(S*sg) \quad (2)$$

x: film thickness (μm)
sc: coating solids content (g)
S: evaluation area of coating solids content (cm$^2$)
sg: specific gravity of the coating film (g/cm$^3$)

Examples 43 to 83 and 86, and Comparative Examples 9 to 16

Test plates were obtained in the same manner as in Example 42 except that the colored paint (W), the transparent base paint (X), the effect paint for automobiles (Y), and the clear paint (Z) shown in Table 2 were used.

Example 84

Step (1): The colored paint (W-3) was electrostatically applied to substrate 1 to give a cured film thickness of 25 μm with a rotary-atomization bell coater. The substrate thus coated was allowed to stand for 3 minutes and preheated at 80° C. for 3 minutes, thereby forming a colored coating film.

Step (2): Subsequently, the effect paint for automobiles (Y-1) prepared as described above was adjusted to the coating viscosity shown in Table 1, and applied to the colored coating film to give a dry coating film thickness of 1.0 μm at a booth temperature of 23° C. and a humidity of 68% using a Robot Bell (produced by ABB). The coated substrate was allowed to stand for 3 minutes and then preheated at 80° C. for 3 minutes, thus forming an effect coating film.

Step (3): Further, the clear paint (Z-1) was applied to the effect coating film to give a dry film thickness of 35 μm at a booth temperature of 23° C. and a humidity of 68% using a Robot Bell (produced by ABB), thereby forming a clear coating film.

Step (4): After the application, the resulting coated substrate was allowed to stand at room temperature for 7 minutes and then heated in a hot-air circulation drying oven at 140° C. for 30 minutes to simultaneously dry the multi-layers of the coating film, thus forming a test plate.

Example 85

Step (1): The colored paint (W-3) was electrostatically applied to substrate 1 to a give cured film thickness of 25 μm using a rotary-atomization bell coater. The substrate thus coated was allowed to stand for 3 minutes and preheated at 80° C. for 3 minutes, thereby forming a colored coating film.

Step (2): Subsequently, the transparent base paint (X-1) was electrostatically applied to the colored coating film to give a cured film thickness of 10 μm using a rotary-atomization bell coater, and allowed to stand for 2 minutes.

Step (3): Further, the effect paint for automobiles (Y-1), prepared as described above, was adjusted to the coating viscosity as shown in Table 1 and applied to the coating film to give a dry film thickness of 1.0 μm at a booth temperature of 23° C. and a humidity of 68% using a Robot Bell (produced by ABB). The substrate thus coated was allowed to stand for 3 minutes and then preheated at 80° C. for 3 minutes, thereby forming an effect coating film.

Step (4): Further, the clear paint (Z-1) was applied to the effect coating film to give a dry film thickness of 35 μm at a booth temperature of 23° C. and a humidity of 68% using a Robot Bell (produced by ABB), thereby forming a clear coating film.

Step (5): After the application, the resulting coated substrate was allowed to stand at room temperature for 7 minutes and then heated in a hot-air circulation drying oven at 140° C. for 30 minutes to simultaneously dry the multi-layers of the coating film, thus forming a test plate.

Example 87

Step (1): The colored paint (W-4) was electrostatically applied to substrate 2 to give a cured film thickness of 10 μm using a rotary-atomization bell coater. The substrate thus coated was allowed to stand for 3 minutes and preheated at 80° C. for 3 minutes, thereby forming a colored coating film.

Step (2): Subsequently, the transparent base paint (X-1) was electrostatically applied to the colored coating film to give a cured film thickness of 10 μm using a rotary-atomization bell coater, and allowed to stand for 2 minutes.

Step (3): Further, the effect paint for automobiles (Y-1), prepared as described above, was adjusted to the coating viscosity as shown in Table 1 and applied to the coating film to give a dry film thickness of 1.0 μm at a booth temperature of 23° C. and a humidity of 68% using a Robot Bell (produced by ABB). The substrate thus coated was allowed to stand for 3 minutes and then preheated at 80° C. for 3 minutes, thereby forming an effect coating film.

Step (4): Further, the clear paint (Z-3) was applied to the effect coating film to give a dry film thickness of 35 μm at a booth temperature of 23° C. and a humidity of 68% using a Robot Bell (produced by ABB), thereby forming a clear coating film.

Step (5): After the application, the resulting coated substrate was allowed to stand at room temperature for 7 minutes and then heated in a hot-air circulation drying oven at 120° C. for 30 minutes to simultaneously dry the multi-layers of the coating film, thus forming a test plate.

Example 88

Step (1): The colored paint (W-4) was electrostatically applied to substrate 2 to give a cured film thickness of 10 μm using a rotary-atomization bell coater. The substrate thus coated was allowed to stand for 3 minutes, thereby forming a colored coating film.

Step (2): Subsequently, the transparent base paint (X-1) was electrostatically applied to the colored coating film to give a cured film thickness of 10 μm using a rotary-atomization bell coater, and allowed to stand for 2 minutes.

Step (3): Further, the effect paint for automobiles (Y-1), prepared as described above, was adjusted to the coating viscosity as shown in Table 1 and applied to the coating film to give a dry film thickness of 1.0 μm at a booth temperature of 23° C. and a humidity of 68% using a Robot Bell (produced by ABB). The substrate thus coated was allowed to stand for 3 minutes and then preheated at 80° C. for 3 minutes, thereby forming an effect coating film.

Step (4): Further, the clear paint (Z-3) was applied to the effect coating film to give a dry film thickness of 35 μm at a booth temperature of 23° C. and a humidity of 68% using a Robot Bell (produced by ABB), thereby forming a clear coating film.

Step (5): After the application, the resulting coated substrate was allowed to stand at room temperature for 7 minutes and then heated in a hot-air circulation drying oven at 120° C. for 30 minutes to simultaneously dry the multi-layers of the coating film, thus forming a test plate.

TABLE 2

| | | Examples | | | | | | | | | |
|---|---|---|---|---|---|---|---|---|---|---|---|
| | | 42 | 43 | 44 | 45 | 46 | 47 | 48 | 49 | 50 | 51 | 58 |
| Film Structure | Substrate | 1 | 1 | 1 | 1 | 1 | 1 | 1 | 1 | 1 | 1 | 1 |
| | Colored Paint | W-1 | W-1 | W-1 | W-1 | W-1 | W-1 | W-1 | W-1 | W-1 | W-1 | W-1 |
| | Transparent Base Paint | X-1 | X-1 | X-1 | X-1 | X-1 | X-1 | X-1 | X-1 | X-1 | X-1 | X-1 |
| | Effect Paint for Automobiles | Y-1 | Y-2 | Y-3 | Y-4 | Y-5 | Y-6 | Y-7 | Y-8 | Y-9 | Y-10 | Y-17 |
| | Clear Paint | Z-1 | Z-1 | Z-1 | Z-1 | Z-1 | Z-1 | Z-1 | Z-1 | Z-1 | Z-1 | Z-1 |
| Coating Film Appearance | 60 Degree Gloss | 156 | 158 | 154 | 153 | 152 | 154 | 152 | 151 | 152 | 156 | 102 |
| | Graininess | 40.7 | 39.2 | 43.2 | 43.5 | 43.8 | 41.5 | 43.3 | 44.5 | 44.1 | 41.2 | 40.2 |
| Coating Film Performance | Waterproof Adhesion | B | B | B | B | B | B | B | B | B | B | B |
| | Waterproof Adhesion After Long-Term Accelerated Weathering Test | B | C | B | B | B | B | B | B | B | B | B |
| | Viscosity | | | | | | | | | | | |
| | Stability of Paint | B | B | B | B | B | B | B | B | B | B | B |

| | | Examples | | | | | | | | | | |
|---|---|---|---|---|---|---|---|---|---|---|---|---|
| | | 59 | 60 | 61 | 62 | 63 | 64 | 65 | 66 | 67 | 68 | 69 |
| Film Structure | Substrate | 1 | 1 | 1 | 1 | 1 | 1 | 1 | 1 | 1 | 1 | 1 |
| | Colored Paint | W-1 | W-1 | W-1 | W-1 | W-1 | W-1 | W-1 | W-1 | W-1 | W-1 | W-1 |
| | Transparent Base Paint | X-1 | X-1 | X-1 | X-1 | X-1 | X-1 | X-1 | X-1 | X-1 | X-1 | X-1 |
| | Effect Paint for Automobiles | Y-18 | Y-19 | Y-20 | Y-21 | Y-22 | Y-23 | Y-24 | Y-25 | Y-26 | Y-27 | Y-28 |
| | Clear Paint | Z-1 | Z-1 | Z-1 | Z-1 | Z-1 | Z-1 | Z-1 | Z-1 | Z-1 | Z-1 | Z-1 |
| Coating Film Appearance | 60 Degree Gloss | 153 | 152 | 141 | 166 | 151 | 155 | 157 | 156 | 171 | 150 | 151 |
| | Graininess | 38.6 | 40.1 | 36 | 35 | 49.3 | 40.2 | 40.9 | 42.3 | 30.7 | 42.8 | 44.3 |
| Coating Film Performance | Waterproof Adhesion | B | B | B | C | A | B | B | B | B | B | B |
| | Waterproof Adhesion After Long-Term Accelerated Weathering Test | B | C | C | C | A | C | C | B | B | B | B |
| | Viscosity | | | | | | | | | | | |
| | Stability of Paint | B | B | B | C | A | B | B | B | B | B | B |

| | | Examples | | | | | | | | | | |
|---|---|---|---|---|---|---|---|---|---|---|---|---|
| | | 70 | 71 | 72 | 73 | 74 | 75 | 76 | 77 | 78 | 79 | 80 |
| Film Structure | Substrate | 1 | 1 | 1 | 1 | 1 | 1 | 1 | 1 | 1 | 1 | 1 |
| | Colored Paint | W-1 | W-1 | W-1 | W-1 | W-1 | W-1 | W-1 | W-1 | W-1 | W-1 | W-1 |
| | Transparent Base Paint | X-1 | X-1 | X-1 | X-1 | X-1 | X-1 | X-1 | X-1 | X-1 | X-1 | X-1 |
| | Effect Paint for Automobiles | Y-29 | Y-30 | Y-31 | Y-32 | Y-33 | Y-34 | Y-35 | Y-36 | Y-37 | Y-38 | Y-39 |
| | Clear Paint | Z-1 | Z-1 | Z-1 | Z-1 | Z-1 | Z-1 | Z-1 | Z-1 | Z-1 | Z-1 | Z-1 |
| Coating Film Appearance | 60 Degree Gloss | 151 | 158 | 152 | 158 | 157 | 163 | 142 | 153 | 146 | 162 | 140 |
| | Graininess | 42.7 | 39.1 | 44.3 | 40.2 | 40.7 | 36 | 45 | 42.7 | 47 | 36.6 | 47.2 |
| Coating Film Performance | Waterproof Adhesion | B | B | B | B | B | B | B | B | B | B | B |
| | Waterproof Adhesion After Long-Term Accelerated Weathering Test | B | C | C | B | B | B | B | B | C | B | B |
| | Viscosity | | | | | | | | | | | |
| | Stability of Paint | B | B | B | B | B | B | B | B | B | B | B |

TABLE 2-continued

| | | | Examples | | | | | | | |
|---|---|---|---|---|---|---|---|---|---|---|
| | | | 81 | 82 | 83 | 84 | 85 | 86 | 87 | 88 |
| Film Structure | Substrate | | 1 | 1 | 1 | 1 | 1 | 1 | 1 | 1 |
| | Colored Paint | | W-1 | W-1 | W-2 | W-3 | W-3 | W-1 | W-4 | W-4 |
| | Transparent Base Paint | | X-1 | X-1 | X-2 | None | X-1 | X-1 | X-1 | X-1 |
| | Effect Paint for Automobiles | | Y-40 | Y-41 | Y-15 | Y-1 | Y-1 | Y-1 | Y-1 | Y-1 |
| | Clear Paint | | Z-1 | Z-1 | Z-1 | Z-1 | Z-1 | Z-2 | Z-3 | Z-3 |
| Coating Film Appearance | 60 Degree Gloss | | 154 | 143 | 123 | 146 | 144 | 96 | 153 | 151 |
| | Graininess | | 42.1 | 49.2 | 60 | 38.9 | 40.8 | 36.2 | 41.9 | 43.7 |
| Coating Film Performance | Waterproof Adhesion | | B | B | B | B | B | B | B | B |
| | Waterproof Adhesion After Long-Term Accelerated Weathering Test | | B | B | B | B | B | C | C | C |
| | Viscosity | | | | | | | | | |
| | Stability of Paint | | B | B | B | B | B | B | B | B |

| | | | Example 42 | Comparative Example 9 | Comparative Example 16 | Exam- ple 52 | Comparative Example 100 | Example 53 | Comparative Example 11 | Example 54 | Comparative Example 12 |
|---|---|---|---|---|---|---|---|---|---|---|---|
| Film Structure | Substrate | | 1 | 1 | 1 | 1 | 1 | 1 | 1 | 1 | 1 |
| | Colored Paint | | W-1 | W-1 | W-1 | W-1 | W-1 | W-1 | W-1 | W-1 | W-1 |
| | Transparent Base Paint | | X-1 | X-1 | X-1 | X-1 | X-1 | X-1 | X-1 | X-1 | X-1 |
| | Effect Paint for Automobiles | Item Name | Y-1 | Y-42 | Y-49 | Y-11 | Y-43 | Y-12 | Y-44 | Y-13 | Y-45 |
| | | Aron T-50 (B-1) | 0.25 | | 025 | 0.25 | | 0.25 | | | |
| | Dispersant (A) | Hydroshine WS3001 | 0.5 | 0.5 | | 0.5 | 0.5 | 0.5 | 0.5 | 0.6 | 0.6 |
| | Cellulose Nanofiber (B) | Alpaste EMR-B6360 | 1.2 | 1.2 | 12 | 1.57 | 1.57 | | 1.57 | | |
| | Effect Pigment (C) | Metalure Liquid Black | 0.37 | 0.37 | 0.37 | | | 1.57 | | 3.14 | 3 14 |
| | Clear Paint | | Z-1 | Z-1 | Z-1 | Z-1 | Z-1 | Z-1 | Z-1 | Z-1 | Z-1 |
| Coating Film Appearance | 60 Degree Gloss | | 156 | 145 | 136 | 163 | 152 | 140 | 130 | 124 | 114 |
| | Graininess | | 40.7 | 43.5 | 460 | 29.8 | 32.0 | 460 | 49.0 | 15.5 | 17.4 |
| Coating Film Performance | Waterproof Adhesion | | B | E | E | B | E | B | D | 8 | C |
| | Waterproof Adhesion After Long-Term Accelerated Weathering Test | | B | E | E | B | E | B | E | B | C |
| | Viscosity | | | | | | | | | | |
| | Stability of Paint | | B | B | B | B | B | B | B | B | B |

TABLE 2-continued

| | | Item Name | Example 55 | Comparative Example 13 | Example 56 | Comparative Example 14 | Example 57 | Comparative Example 15 |
|---|---|---|---|---|---|---|---|---|
| Film Structure | Substrate | | 1 | 1 | 1 | 1 | 1 | 1 |
| | Colored Paint | | W-2 | W-2 | W-2 | W-2 | W-2 | W-2 |
| | Transparent Base Paint | | X-1 | X-1 | X-1 | X-1 | X-1 | X-1 |
| Effect Paint for Automobiles | | | Y-14 | Y-46 | Y-15 | Y-47 | Y-16 | Y-48 |
| | Dispersant (A) | Aron T-50 | 0.29 | 0.29 | | | 0.29 | |
| | Cellulose Nanofiber (B) | (B-1) | 0.6 | 0.6 | 0.6 | 0.6 | 0.6 | 0.6 |
| | Effect Pigment (C) | Xirallic T61-10 Micro Silver | 2.74 | 2.74 | | | | |
| | | Xirallic T61-10 Crystal Silver | | | 2.74 | 2.74 | | |
| | | Pyrisma M40-58 SW A Orange | | | | | 2.74 | 2.74 |
| | Clear Paint | | Z-1 | Z-1 | Z-1 | Z-1 | Z-1 | Z-1 |
| Coating Film Appearance | 60 Degree Gloss | | 119 | 108 | 125 | 116 | 105 | 91 |
| | Graininess | | 47.0 | 51.0 | 58.0 | 60.0 | 48.1 | 56.0 |
| Coating Film Performance | Waterproof Adhesion | | B | E | B | D | B | D |
| | Waterproof Adhesion After Long-Term Accelerated Weathering Test | | B | E | B | E | B | E |
| | Viscosity Stability of Paint | | B | B | B | B | B | B |

Evaluation of Coating Films

The appearance and performance of the coating films of the test plates obtained as described above, and paint stability were evaluated. Table 2 show the results. The appearance of each coating film was evaluated in terms of 60° specular gloss (60 degree gloss) and graininess. The coating film performance was evaluated in terms of waterproof adhesion, and waterproof adhesion after a long-term accelerated weathering test.

A comparison between Examples 42 and 52 to 57 and Comparative Examples 9 to 15 indicates that when the type and amount of the effect pigment (C) present in the effect paint for automobiles are the same, the coating films of the Examples, containing the dispersant (A), exhibited both an increased value of 60 degree gloss and a decreased HG of graininess, indicating excellent appearance, compared with the coating films of the Comparative Examples, not containing the dispersant (A)

A comparison between Example 42 and Comparative Example 16 indicates that when the type and amount of the effect pigment (C) present in the effect paint for automobiles are the same, the coating film of the Example, containing the cellulose nanofiber (B), exhibited both an increased value of 60 degree gloss and a decreased HG of graininess, indicating excellent appearance, compared with the coating film of the Comparative Example, not containing the cellulose nanofiber (B).

Additionally, the multilayer coating films of Examples 42 to 88 according to the present invention are also excellent in coating film performance.

60° Specular Gloss (60 Degree Gloss)

The 60 degree gloss value of the test plates obtained above was measured using a glossmeter (micro-TRI-gloss, produced by BYK-Gardner). The higher the value, the better.

Graininess

The graininess was evaluated as a hi-light graininess value (hereinafter abbreviated as "HG value"). The HG value is a parameter of microscopic brilliance obtained by microscopic observation of a coating surface, and indicates the graininess in the highlight. The HG value is calculated as follows. The coating surface is first photographed with a CCD camera at a light incidence angle of 15° and a receiving angle of 0°, and the obtained digital image data (two-dimensional luminance distribution data) is subjected to a two-dimensional Fourier transform to obtain a power spectrum image. Subsequently, only the spatial frequency domain corresponding to graininess is extracted from the power spectrum image, and the obtained measurement parameter is converted to an HG value from 0 to 100 that has a linear relation with graininess. An HG value of 0 indicates no graininess of the effect pigment, whereas an HG value of 100 indicates the highest possible graininess of the effect pigment.

Waterproof Adhesion

The test plates were immersed in warm water at 40° C. for 240 hours, and then drawn out. Water droplets and dirt were wiped away with a cloth. Cross-cuts that reached the substrate of each test plate were then made to form a grid of 100 squares (2 mm×2 mm) on the multilayer coating film of the plate with a utility knife at room temperature of 23° C. within 10 minutes. Subsequently, an adhesive cellophane tape was applied to the surface of the grid portion, and then abruptly peeled off. The condition of the remaining squares of the grid in the coating film was examined, and water resistance was evaluated in accordance with the following criteria.

A: 100 squares of the grid of the coating film remained, and no slight edge-peeling occurred at the edge of cuts made by the knife.
B: 100 squares of the grid of the coating film remained, but slight edge-peeling occurred at the edge of cuts made by the knife, with the number of squares of the grid of the coating film having edge-peeling being less than 10.
C: 100 squares of the grid of the coating film remained, but slight edge-peeling occurred at the edge of cuts made by the knife, with the number of squares of the grid of the coating film having edge-peeling being 10 or more.
D: The number of remaining squares of the grid of the coating film is 90 to 99.
E: The number of remaining squares of the grid of the coating film is 89 or less.

Waterproof Adhesion after Long-Term Accelerated Weathering Test

A long-term accelerated weathering test was performed using the Super Xenon Weather Meter (trade name, Suga Test Instruments Co., Ltd.) specified in JIS B 7754. More specifically, the test plates were irradiated with a xenon arc lamp for 1 hour and 42 minutes, and then exposed to rainfall for 18 minutes. This 2-hour session of irradiation with the lamp was defined as 1 cycle. This cycle was repeated for 4000 hours, after which the same procedures as in the waterproof adhesion test described above were performed.

Viscosity Stability of Paint 320 g of the obtained effect paint for automobiles was prepared. 20 g out of 320 g of the obtained effect paint was allowed to stand at 23° C. for 6 hours and measured for viscosity at a temperature of 23° C. and at a shear rate of 0.1 $(s^{-1})$ (viscosity before stirring) with a rheometer (RS150, produced by HAAKE). 300 g of the remaining effect paint for automobiles was placed in a 500-mL beaker, and the content in the beaker was stirred up and down to make it homogeneous, followed by stirring it with a magnet stirrer at a temperature of 23° C. at 1,000 rpm for 24 hours. The opening of the beaker was sealed with parafilm to prevent the evaporation of water during stirring. The effect paint for automobiles stirred for 24 hours was allowed to stand at a temperature of 23° C. for 6 hours, and then measured for viscosity at a temperature of 23° C. and at a shear rate of 0.1 $(s^{-1})$ with a rheometer (RS150, produced by HAAKE) (viscosity after stirring).

Subsequently, the change in viscosity (%) at a shear rate of 0.1 $(s^{-1})$ was calculated by the following formula, and viscosity stability was evaluated on the basis of the following criteria. A rating of C or higher is considered as "pass."

Change in viscosity (%) at a shear rate of 0.1 $(s^{-1})$= (|viscosity before stirring−viscosity after stirring|/viscosity before stirring)×100

A: a change in viscosity of less than 30%
B: a change in viscosity of 30% or more and less than 40%
C: a change in viscosity of 40% or more and less than 60%
D: a change in viscosity of 60% or more and less than 70%
E: a change in viscosity of 70% or more.

The embodiments of the present invention and Examples thereof are specifically described above. However, the present invention is not limited to the above embodiments. Various modifications can be made based on the technical idea of the present invention.

The invention claimed is:

1. An effect paint for automobiles, comprising water, a dispersant (A), cellulose nanofibers (B), and an effect pigment (C), wherein the dispersant (A) is an anionic polymer compound, wherein the anionic polymer compound is a carboxy-containing polymer or a phosphate group-containing polymer compound, the cellulose nanofibers (B) are oxidized cellulose nanofibers, the oxidized cellulose nanofibers have a carboxyl group amount of 0.4 to 1.0 mmol/g based on an absolute dry mass of the oxidized cellulose nanofibers, and the cellulose nanofibers (B) have a transparency of 80% or more in a 1.0 mass % aqueous dispersion of the cellulose nanofibers (B).

2. The effect paint for automobiles according to claim 1, which has a solids content of 0.1 to 10 parts by mass, per 100 parts by mass of all of the components.

\* \* \* \* \*